US012681600B2

(12) United States Patent
Su et al.

(10) Patent No.: US 12,681,600 B2
(45) Date of Patent: Jul. 14, 2026

(54) ARRAY SUBSTRATE, TOUCH DISPLAY DEVICE

(71) Applicants: Beijing BOE Display Technology Co., Ltd., Beijing (CN); BOE TECHNOLOGY GROUP CO., LTD., Beijing (CN); BEIJING BOE TECHNOLOGY DEVELOPMENT CO., LTD., Beijing (CN)

(72) Inventors: Qiujie Su, Beijing (CN); Wenjie Hou, Beijing (CN); Tao Yang, Beijing (CN); Yingmeng Miao, Beijing (CN); Xiaofeng Yin, Beijing (CN); Jie Gao, Beijing (CN)

(73) Assignees: Beijing BOE Display Technology Co., Ltd., Beijing (CN); BOE Technology Group Co., Ltd., Beijing (CN); Beijing BOE Technology Development Co. Ltd., Beijing (CN)

( * ) Notice: Subject to any disclaimer, the term of this patent is extended or adjusted under 35 U.S.C. 154(b) by 206 days.

(21) Appl. No.: 18/834,640

(22) PCT Filed: May 16, 2023

(86) PCT No.: PCT/CN2023/094464

§ 371 (c)(1),
(2) Date: Jul. 31, 2024

(87) PCT Pub. No.: WO2024/234285

PCT Pub. Date: Nov. 21, 2024

(65) Prior Publication Data

US 2026/0186597 A1     Jul. 2, 2026

(51) Int. Cl.
*G06F 3/041* (2006.01)
*G02F 1/1362* (2006.01)
(Continued)

(52) U.S. Cl.
CPC .... *G06F 3/04164* (2019.05); *G02F 1/136286* (2013.01); *G02F 1/1368* (2013.01); *G06F 3/0412* (2013.01); *G06F 3/0446* (2019.05)

(58) Field of Classification Search
CPC .... G06F 3/0412; G06F 3/0443; G06F 3/0446; G06F 3/04164; G06F 3/04166;
(Continued)

(56) References Cited

U.S. PATENT DOCUMENTS

2020/0234647 A1* 7/2020 Lin ...................... G09G 3/3266
2021/0256930 A1 8/2021 Chen et al.
(Continued)

FOREIGN PATENT DOCUMENTS

CN     107132686 A     9/2017
CN     112151592 A     12/2020
(Continued)

OTHER PUBLICATIONS

International Search Report of PCT application No. PCT/CN2023/094464 dated Jan. 4, 2024.

*Primary Examiner* — Dong Hui Liang
(74) *Attorney, Agent, or Firm* — Calfee, Halter & Griswold LLP

(57) ABSTRACT

An array substrate and a touch display device are provided. The array substrate includes: a base substrate including a plurality of pixels; a pixel electrode; a touch sensing block including a plurality of touch electrodes; touch signal lines, each touch sensing block being connected to at least one touch signal line; a first connection line, two adjacent rows of touch electrodes in each touch sensing block being connected through the first connection line; a second connection line that does not overlap with the touch signal line, the pixel electrode being connected to the TFT through the second connection line. The pixel structure is a Z-architec-
(Continued)

ture pixel. Every four adjacent pixels are a repeating unit, and each repeating unit includes four adjacent sub-pixels arranged in two rows and two columns, the pixel electrodes of two diagonally opposite sub-pixels are respectively connected to the TFT through the second connection line, and the touch electrodes of the other two diagonally opposite sub-pixels are connected through the first connection line.

34 Claims, 15 Drawing Sheets

(51) Int. Cl.
G02F 1/1368 (2006.01)
G06F 3/044 (2006.01)

(58) Field of Classification Search
CPC ........ G06F 3/041; G06F 3/0445; G06F 3/044; G06F 3/0448; G06F 3/0416; G06F 3/047; G06F 3/045; G06F 3/0418; G06F 3/04184; G06F 3/03547; G06F 3/042; G06F 3/0414; G06F 3/0447; G06F 3/041662; G06F 3/0421; G06F 3/046; G06F 2203/04103; G06F 2203/04111; G06F 2203/04104; G06F 2203/04107; G06F 2203/04112; G06F 2203/04101; G06F 2203/04106; G02F 1/136286; G02F 1/1368; G02F 1/1362; G02F 1/13338
See application file for complete search history.

(56) References Cited

U.S. PATENT DOCUMENTS

| | | | |
|---|---|---|---|
| 2022/0291558 A1* | 9/2022 | Su | G02F 1/136222 |
| 2023/0259243 A1* | 8/2023 | Tanaka | G06T 1/00 |
| | | | 345/173 |

FOREIGN PATENT DOCUMENTS

| | | |
|---|---|---|
| CN | 112860117 A | 5/2021 |
| CN | 113325638 A | 8/2021 |
| CN | 113504681 A | 10/2021 |
| CN | 113870808 A | 12/2021 |
| CN | 115206253 A | 10/2022 |
| KR | 20120025923 A | 3/2012 |
| WO | 2017130293 A1 | 8/2017 |
| WO | 2022156131 A1 | 7/2022 |

* cited by examiner touch display device array substrate

Fig. 17

ARRAY SUBSTRATE, TOUCH DISPLAY DEVICE

This application is the National Stage Entry of PCT/CN2023/094464, filed May 16, 2023, the entire disclosure of which is incorporated by reference in its entirety.

TECHNICAL FIELD

The present disclosure relates to the field of display technology, and in particular to an array substrate and a touch display device comprising the array substrate.

BACKGROUND

As an important tool for human-computer interaction, touch display panels have been widely used in display products such as smartphones, tablets, laptops, and monitors. Among various types of touch display panels, capacitive touch display panels are widely used due to their stronger sensitivity and multi-touch capabilities.

SUMMARY

According to one aspect of the present disclosure, there is provided an array substrate comprising: a base substrate comprising a plurality of pixels arranged in an array, the plurality of pixels comprising a plurality of sub-pixels arranged in an array, each of the plurality of sub-pixels comprising a pixel electrode, a touch electrode, and a thin film transistor; a plurality of touch sensing blocks on the base substrate and electrically insulated from each other, each of the plurality of touch sensing blocks comprising a plurality of touch electrodes, the plurality of touch electrodes of each touch sensing block electrically connected to each other and arranged in an array; a plurality of gate lines extending along a first direction, each row of sub-pixels being associated with two gate lines among the plurality of gate lines; a plurality of touch signal lines and a plurality of data lines extending along a second direction, the touch signal lines and the data lines being in a same layer, each touch sensing block being electrically connected to at least one of the plurality of touch signal lines, the first direction intersecting with the second direction; a first connection line, two adjacent rows of touch electrodes in each touch sensing block being electrically connected through the first connection line; and a second connection line, each of at least a part of a plurality of pixel electrodes being electrically connected to a drain of a corresponding thin film transistor through the second connection line, an orthographic projection of the second connection line on the base substrate not overlapping with an orthographic projection of a respective one of the touch signal lines on the base substrate. A gate of the thin film transistor of each sub-pixel is electrically connected to a respective one of the gate lines, the drain of the thin film transistor of each sub-pixel is electrically connected to the pixel electrode of the sub-pixel, a source of the thin film transistor of each sub-pixel is electrically connected to a respective one of the data lines, every two adjacent sub-pixels in a same row of sub-pixels form a unit group, the sources of the thin film transistors of each unit group are electrically connected to a same data line, the gates of the thin film transistors of each unit group are electrically connected to different gate lines, respectively, and the sources of the thin film transistors of two adjacent sub-pixels in the same column of sub-pixels are electrically connected to different data lines, respectively.

Every four adjacent pixels among the plurality of pixels form a repeating unit, each repeating unit comprises four adjacent sub-pixels that are arranged in two rows and two columns, the pixel electrodes of two sub-pixels among the four adjacent sub-pixels that are in different rows and diagonally opposite are respectively electrically connected to the drain of the corresponding thin film transistor through the second connection line, and the touch electrodes of the other two sub-pixels among the four adjacent sub-pixels that are in different rows and diagonally opposite are electrically connected through the first connection line.

In some embodiments, the array substrate further comprises a third connection line, wherein each of the part of the plurality of pixel electrodes is electrically connected to the drain of the corresponding thin film transistor through the second connection line, each of the remaining of the plurality of pixel electrodes is electrically connected to the drain of the corresponding thin film transistor through the third connection line, and an orthographic projection of the third connection line on the base substrate partially overlaps with the orthographic projection of the touch signal line on the base substrate.

In some embodiments, the orthographic projection of the third connection line on the base substrate does not overlap with an orthographic projection of the first connection line on the base substrate.

In some embodiments, a portion where the orthographic projection of the third connection line on the base substrate overlaps with the orthographic projection of the touch signal line on the base substrate forms a first overlapping region, and areas of all first overlapping regions are equal to each other.

In some embodiments, the array substrate further comprises a plurality of common connection lines extending along the first direction, wherein each of the plurality of common connection lines is arranged between two adjacent rows of sub-pixels, the individual touch electrodes in a same row of each touch sensing block are electrically connected to each other through the common connection line, and each common connection line is disconnected at an interval region between two adjacent touch sensing blocks.

In some embodiments, the data line is arranged at the interval region between any two adjacent touch sensing blocks along the first direction, a disconnected portion of the common connection line at the interval region is on a first side of the data line, a continuous portion of the common connection line comprises a first sub-section, a second sub-section, and a third sub-section that are sequentially connected, the first sub-section is on a second side of the data line, the third sub-section is on the first side of the data line, the second sub-section is between the first sub-section and the third sub-section, and an orthographic projection of the second sub-section on the base substrate falls within an orthographic projection of the data line on the base substrate.

In some embodiments, a length of the third sub-section along the first direction is greater than or equal to a first threshold.

In some embodiments, the array substrate further comprises a fourth connection line, wherein a first end of the fourth connection line is electrically connected to the touch electrode of one of any two adjacent touch sensing blocks along the second direction, a second end of the fourth connection line is disconnected from the touch electrode of the other of the any two adjacent touch sensing blocks along the second direction, so that the any two adjacent touch sensing blocks along the second direction are electrically insulated from each other.

In some embodiments, an orthographic projection of the fourth connection line on the base substrate spans an orthographic projection of two gate lines between the any two adjacent touch sensing blocks along the second direction on the base substrate, and a distance that the second end of the fourth connection line extends beyond one of the two gate lines that is closest to the second end is greater than or equal to a second threshold.

In some embodiments, an orthographic projection of the first connection line on the base substrate partially overlaps with the orthographic projection of the touch signal line on the base substrate, and an extending direction of the first connection line at an overlapping region is perpendicular to an extending direction of the touch signal line at the overlapping region.

In some embodiments, each touch sensing block is electrically connected to at least one of the plurality of touch signal lines through a via, and an orthographic projection of the via on the base substrate does not overlap with an orthographic projection of the first connection line on the base substrate.

In some embodiments, an orthographic projection of the first connection line on the base substrate partially overlaps with the orthographic projection of the touch signal line on the base substrate, and the first connection line is arranged between two adjacent rows of sub-pixels in each repeating unit.

In some embodiments, each repeating unit is further provided with a compensation line, an orthographic projection of the compensation line on the base substrate partially overlaps with the orthographic projection of the touch signal line on the base substrate, and the touch signal line overlapping with the compensation line and the touch signal line overlapping with the first connection line in each repeating unit are two different touch signal lines.

In some embodiments, the compensation line comprises a sub-section extending along the first direction, an orthographic projection of the sub-section on the base substrate partially overlaps with the orthographic projection of the touch signal line on the base substrate, and two opposite ends of the sub-section in the first direction both extend beyond the touch signal line.

In some embodiments, the orthographic projection of the compensation line on the base substrate does not overlap with orthographic projections of the gate line and the common connection line on the base substrate.

In some embodiments, a width of the compensation line is equal to a width of the first connection line.

In some embodiments, a portion where the orthographic projection of the compensation line on the base substrate overlaps with the orthographic projection of the touch signal line on the base substrate forms a second overlapping region, and areas of all the second overlapping regions are equal to each other.

In some embodiments, width of the touch signal line is greater than a width of the data line.

In some embodiments, the touch signal line comprises a first part and a second part, and a width of the first part is smaller than a width of the second part.

In some embodiments, the array substrate further comprises a light-shielding layer on a side of the touch signal line and the data line away from the base substrate, wherein the light-shielding layer comprises a first light-shielding part and a second light-shielding part, an orthographic projection of the data line on the base substrate falls within an orthographic projection of the first light-shielding part on the base substrate, the orthographic projection of the touch signal line on the base substrate falls within an orthographic projection of the second light-shielding part on the base substrate, a width of the first light-shielding part along the first direction is a first width, a width of the second light-shielding part along the first direction is a second width, a width of each sub-pixel along the first direction is a third width, the first width, the second width, and the third width satisfy the following condition: a ratio of an absolute value of a difference between the first width and the second width to twice the third width is less than or equal to 5%.

In some embodiments, an orthographic projection of the data line on the base substrate does not overlap with an orthographic projection of the touch electrode on the base substrate, and the orthographic projection of the touch signal line on the base substrate does not overlap with the orthographic projection of the touch electrode on the base substrate.

In some embodiments, one data line is arranged every two columns of sub-pixels, and each of at least a part of the plurality of data lines is arranged between two adjacent columns of sub-pixels; and one touch signal line is arranged every two columns of sub-pixels, and each touch signal line is arranged between two adjacent columns of sub-pixels and between two adjacent data lines.

In some embodiments, the orthographic projection of the touch electrode in each sub-pixel on the base substrate at least partially overlaps with an orthographic projection of the pixel electrode in the sub-pixel on the base substrate, for each data line and two columns of sub-pixels on both sides of the data line, a distance between the orthographic projection of the touch electrodes in each column of sub-pixels among the two columns of sub-pixels on the base substrate and the orthographic projection of the data line on the base substrate is a first distance, a distance between the orthographic projection of the pixel electrodes in each column of sub-pixels among the two columns of sub-pixels on the base substrate and the orthographic projection of the data line on the base substrate is a second distance, the second distance is greater than the first distance and a difference between the second distance and the first distance is greater than or equal to a third threshold.

In some embodiments, for each touch signal line and two columns of sub-pixels on both sides of the touch signal line, a distance between the orthographic projection of the touch electrodes in each column of sub-pixels among the two columns of sub-pixels on the base substrate and the orthographic projection of the touch signal line on the base substrate is a third distance, a distance between the orthographic projection of the pixel electrodes in each column of sub-pixels among the two columns of sub-pixels on the base substrate and the orthographic projection of the touch signal line on the base substrate is a fourth distance, the fourth distance is greater than the third distance and a difference between the fourth distance and the third distance is greater than or equal to the third threshold.

In some embodiments, a ratio of a number of the data lines to a number of the touch signal lines is 1:2, one data line is arranged every two columns of sub-pixels, two touch signal lines are arranged every two columns of sub-pixels, and the two touch signal lines are arranged between two adjacent columns of sub-pixels.

In some embodiments, the touch electrode is on the base substrate, the gate line is on a side of the touch electrode away from the base substrate, the data line and the touch signal line are on a side of the gate line away from the base substrate, and the pixel electrode and the first connection line are in a same layer and both are on a side of the data line away from the base substrate.

In some embodiments, the pixel electrode is on the base substrate, the gate line is on a side of the pixel electrode away from the base substrate, the data line and the touch signal line are on a side of the gate line away from the base substrate, the touch electrode and the first connection line are in a same layer and both are on a side of the data line away from the base substrate.

In some embodiments, an extending direction of the first connection line is different from an extending direction of the touch signal line, and an orthographic projection of the first connection line on the base substrate overlaps at most a part with the orthographic projection of the touch signal line on the base substrate.

In some embodiments, each touch sensing block is electrically connected to at least one of the plurality of touch signal lines through a via, and an orthographic projection of the via on the base substrate is between orthographic projections of two gate lines between two adjacent rows of sub-pixels on the base substrate.

In some embodiments, an extending direction of the first connection line is the same as an extending direction of the touch signal line, and an orthographic projection of the first connection line on the base substrate falls within the orthographic projection of the touch signal line on the base substrate.

In some embodiments, the array substrate further comprises a liquid crystal layer. The touch electrode and the pixel electrode are on a same side of the liquid crystal layer, and materials of the touch electrode and the pixel electrode comprise indium tin oxide.

In some embodiments, each pixel comprises a first sub-pixel, a second sub-pixel, and a third sub-pixel sequentially arranged along the first direction, the adjacent four pixels of each repeating unit are arranged in two rows and two columns and comprise a first pixel, a second pixel, a third pixel, and a fourth pixel, the first pixel and the second pixel are in a same row and the first pixel and the third pixel are in a same column, the third pixel and the fourth pixel are in a same row and the second pixel and the fourth pixel are in a same column, the sources of the thin film transistors of the first sub-pixel and the second sub-pixel of the first pixel are electrically connected to a first data line among the plurality of data lines, the sources of the thin film transistors of the third sub-pixel of the first pixel and the first sub-pixel of the second pixel are electrically connected to a second data line among the plurality of data lines, the sources of the thin film transistors of the second sub-pixel and the third sub-pixel of the second pixel are electrically connected to a third data line among the plurality of data lines, the sources of the thin film transistors of the first sub-pixel and the second sub-pixel of the third pixel are electrically connected to the second data line, the sources of the thin film transistors of the third sub-pixel of the third pixel and the first sub-pixel of the fourth pixel are electrically connected to the third data line, and the sources of the thin film transistors of the second sub-pixel and the third sub-pixel of the fourth pixel are electrically connected to a fourth data line among the plurality of data lines.

In some embodiments, the gates of the thin film transistors of all first sub-pixels in the same row of pixels are electrically connected to a first gate line of the two gate lines, the gates of the thin film transistors of all second sub-pixels in the same row of pixels are electrically connected to a second gate line of the two gate lines, and the gates of the thin film transistors of the third sub-pixels of two adjacent pixels in the same row of pixels are electrically connected to the first gate line and the second gate line, respectively.

According to another aspect of the present disclosure, a touch display device is provided. The touch display device comprises the array substrate described in any one of the above embodiments.

BRIEF DESCRIPTION OF THE DRAWINGS

In order to describe the technical solutions in the embodiments of the present disclosure more clearly, the drawings needed to be used in the embodiments will be briefly introduced below. Obviously, the drawings in the following description are only some embodiments of the present disclosure. Those of ordinary skill in the art can also obtain other drawings based on these drawings without undue experimentation.

FIG. 17 illustrates a block diagram of a touch display device according to an embodiment of the present disclosure.

DETAILED DESCRIPTION OF THE DISCLOSURE

The technical solutions in the embodiments of the present disclosure will be clearly and completely described below with reference to the accompanying drawings of the embodiments of the present disclosure. Obviously, the described embodiments are only some, but not all, of the embodiments of the present disclosure. Based on the embodiments of the present disclosure, all other embodiments obtained by those of ordinary skill in the art without undue experimentation fall within the scope of protection of this disclosure.

Touch display devices have a more user-friendly interactive mode, which can greatly improve the user's operating efficiency and comfort, and therefore have become one of the mainstream displays in the display field.

Figure 1:
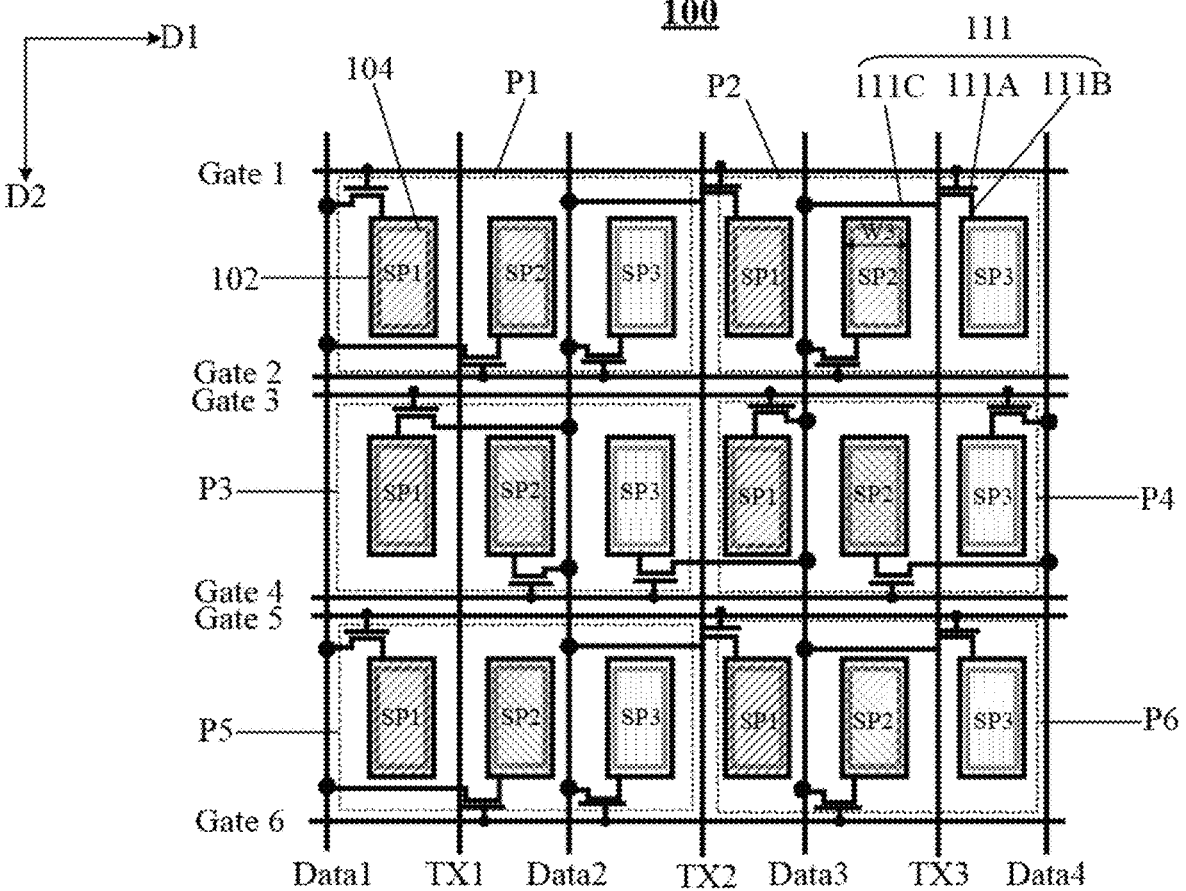
FIG. 1 illustrates a schematic diagram of the arrangement of the pixel structure of the array substrate according to an embodiment of the present disclosure.
Figure 2:
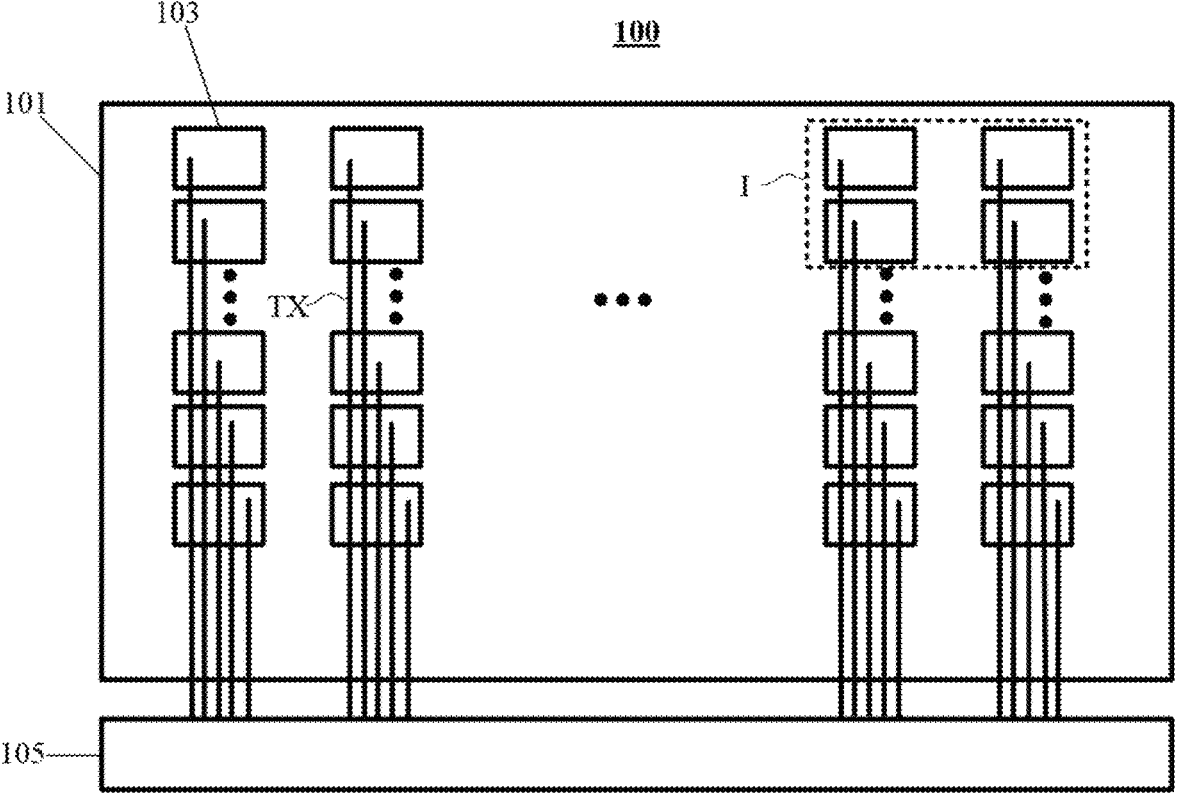
FIG. 2 illustrates the arrangement of the touch sensing blocks according to an embodiment of the present disclosure.
Figure 3:
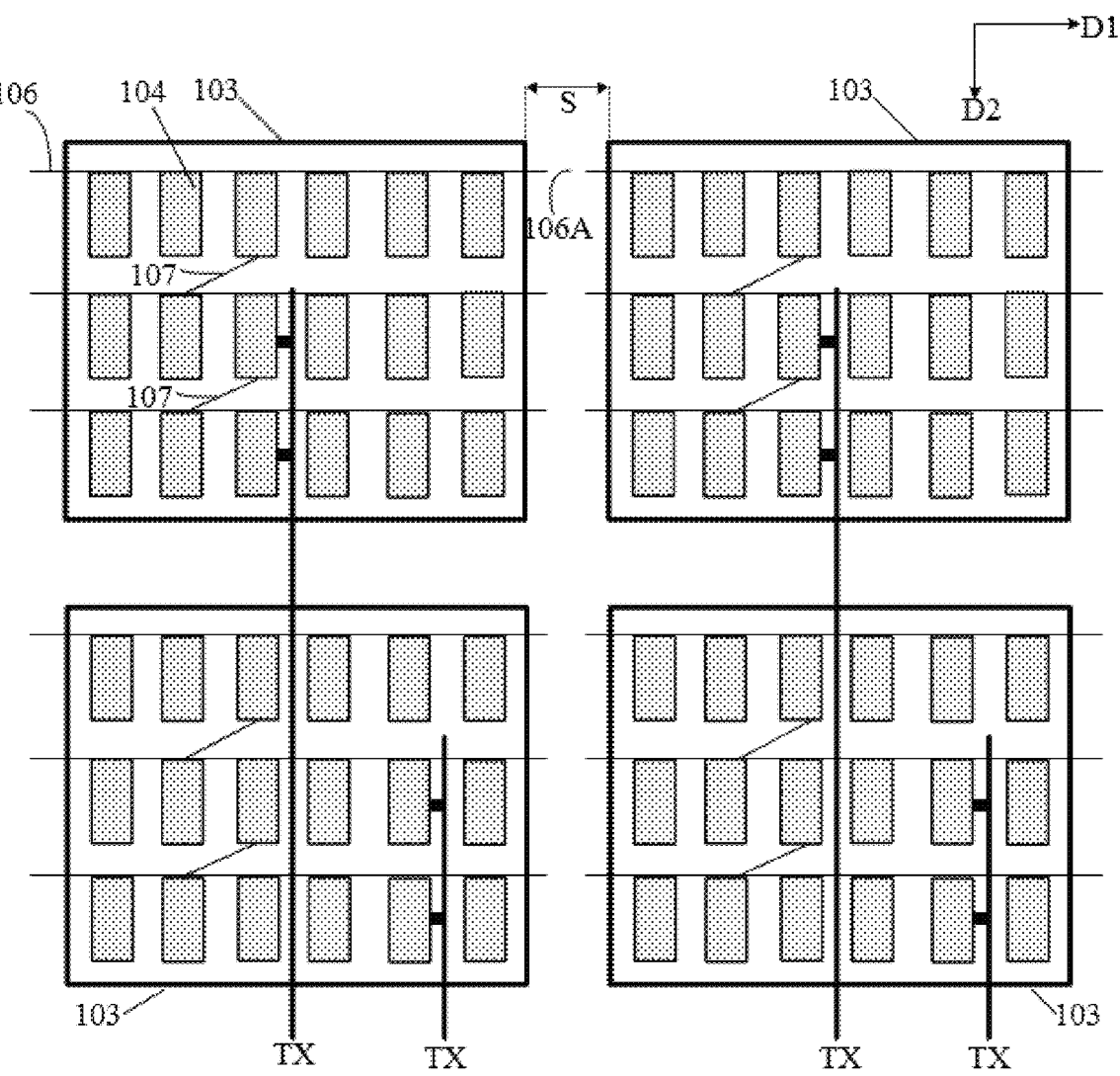
FIG. 3 illustrates a partial enlarged view of region I of FIG. 2.
Figure 4:
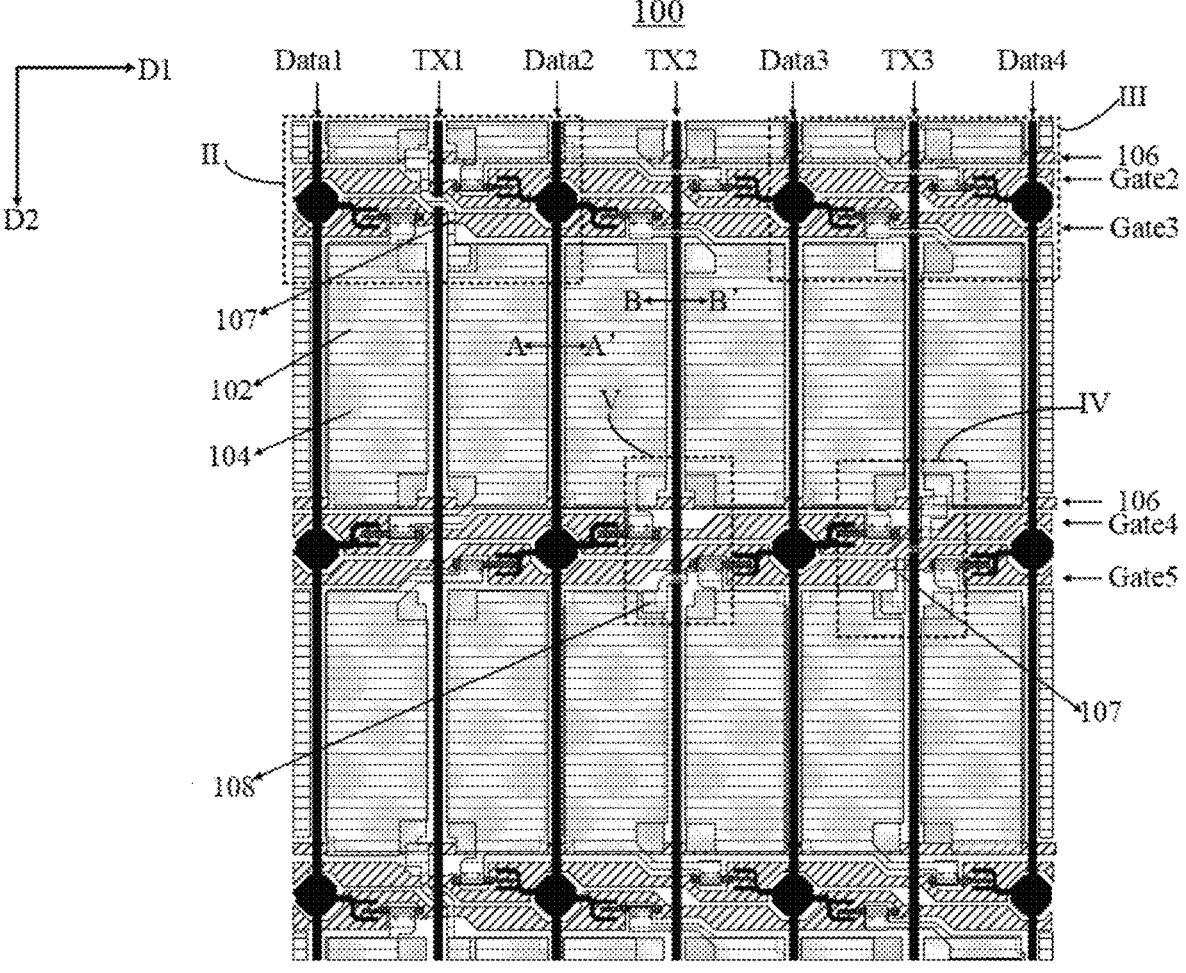
FIG. 4 illustrates a planar schematic diagram of the partial structure of the array substrate according to an embodiment of the present disclosure.
Figure 5:
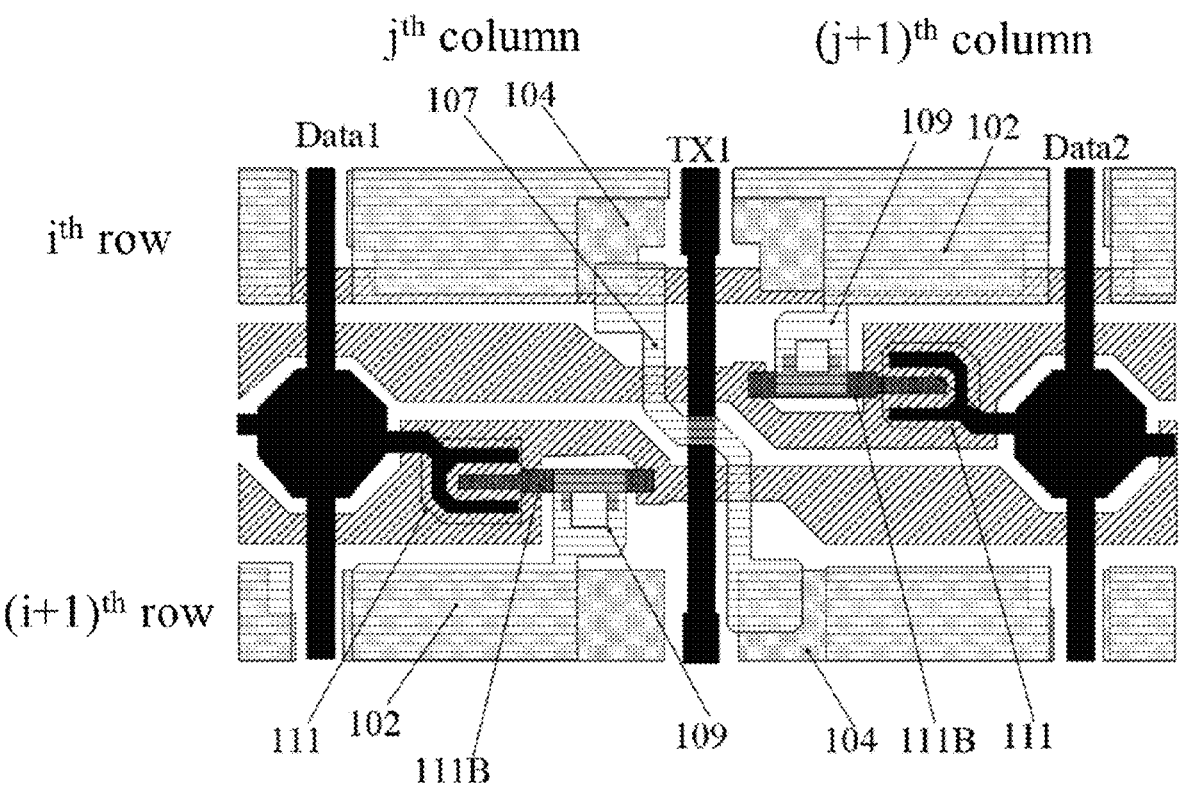
FIG. 5 illustrates a partial enlarged view of region II of FIG. 4.

FIG. 1 is a schematic diagram of the arrangement of the pixel structure of the array substrate 100 provided according to an embodiment of the present disclosure, FIG. 2 is a schematic diagram of the arrangement of multiple touch sensing blocks of the array substrate 100, FIG. 3 is a partial enlarged view of the region I circled by the dotted rectangular frame in FIG. 2, FIG. 4 is a planar schematic diagram of the local structure of the array substrate 100, and FIG. 5 is a partial enlarged view of the region II circled by the dotted rectangular frame in FIG. 4. As illustrated in FIGS. 1 to 5, the array substrate 100 comprises: a base substrate 101, comprising a plurality of pixels arranged in an array, each pixel comprising a first sub-pixel SP1, a second sub-pixel SP2 and a third sub-pixel SP3 sequentially arranged along a first direction D1, the first sub-pixel SP1, the second sub-pixel SP2 and the third sub-pixel SP3 being configured to emit light of different colors, in one embodiment, the first sub-pixel SP1 being configured to emit red light, the second sub-pixel SP2 being configured to emit green light, and the third sub-pixel SP3 being configured to emit blue light; a plurality of pixel electrodes 102 on the base substrate 101, a pixel electrode 102 being arranged in each of the first sub-pixel SP1, the second sub-pixel SP2 and the third sub-pixel SP3; a plurality of touch sensing blocks 103 on the base substrate 101 and electrically insulated from each other, each touch sensing block 103 comprising a plurality of touch electrodes 104 electrically connected to each other and arranged in a plurality of rows, a touch electrode 104 being arranged in each of the first sub-pixel SP1, the second sub-pixel SP2 and the third sub-pixel SP3; a plurality of touch signal lines TX extending along a second direction D2 intersecting the first direction D1, each touch sensing block 103 being electrically connected to at least one of the plurality of touch signal lines TX; a plurality of thin film transistors 111 on the base substrate 101, each of the first sub-pixel SP1, the second sub-pixel SP2 and the third sub-pixel SP3 comprising at least one thin film transistor 111; a plurality of data lines Data extending along the second direction D2, the touch signal line TX and the data line Data in the same layer; a plurality of gate lines Gate extending along a first direction D1, each row of sub-pixels being associated with two gate lines Gate among the plurality of gate lines Gate; a first connection line 107, two adjacent rows of touch electrodes 104 in each touch sensing block 103 being electrically connected through the first connection line 107; and a second connection line 109, each of at least a portion of the plurality of pixel electrodes 102 being electrically connected to a drain 111B of one of the plurality of thin film transistors 111 through the second connection line 109, and an orthographic projection of the second connection line 109 on the base substrate 101 not overlapping with an orthographic projection of the touch signal line TX on the base substrate 101.

A gate 111A of the thin film transistor 111 of each sub-pixel is electrically connected to the gate line Gate, the drain 111B of the thin film transistor 111 of each sub-pixel is electrically connected to the pixel electrode 102 of the sub-pixel, and a source 111C of the thin film transistor 111 of each sub-pixel is electrically connected to the data line Data. Every two adjacent sub-pixels in the same row of sub-pixels constitute a unit group, and the source 111C of the thin film transistor 111 of each unit group is electrically connected to the same data line Data, and the gate 111A of the thin film transistor 111 of each unit group is electrically connected to different gate lines Gate, respectively, and the source 111C of the thin film transistor 111 of two adjacent sub-pixels in the same column of sub-pixels is electrically connected to different data lines Data, respectively. This pixel arrangement mode of the array substrate 100 can be called a Z-architecture pixel. Using the Z-architecture pixel, even if there is a difference in the charging conditions of adjacent data lines Data, there will be no display difference between adjacent pixel columns, thereby avoiding the generation of undesirable phenomena such as vertical stripes or shaking head stripes.

Every four adjacent pixels of the plurality of pixels constitute a repeating unit, and each repeating unit comprises four adjacent sub-pixels that are arranged in two rows and two columns, the pixel electrodes 102 of two sub-pixels that are in different rows and diagonally opposite to each other among the four adjacent sub-pixels are respectively electrically connected to the drain 111B of a corresponding thin film transistor 111 through the second connection line 109, and the touch electrodes 104 of the other two sub-pixels that are in different rows and diagonally opposite to each other among the four adjacent sub-pixels are electrically connected through the first connection line 107. For example, FIG. 5 illustrates the local structure of four adjacent sub-pixels in a repeating unit, and the four sub-pixels are respectively at the $i^{th}$ row and $j^{th}$ column, the $i^{th}$ row and $(j+1)^{th}$ column, the $(i+1)^{th}$ row and $j^{th}$ column, and the $(i+1)^{th}$ row and $(j+1)^{th}$ column, where the i and j are respectively positive integers greater than or equal to 1. As illustrated in FIG. 5, the sub-pixel at the $i^{th}$ row and the $(j+1)^{th}$ column and the sub-pixel at the $(i+1)^{th}$ row and the $j^{th}$ column are in different rows and the two sub-pixels are diagonally opposite to each other. The pixel electrodes 102 of the two sub-pixels are electrically connected to the drain 111B of the corresponding thin film transistor 111 through the second connection line 109, respectively, and the orthographic projection of the second connection line 109 on the base substrate 101 does not overlap with an orthographic projection of the touch signal line TX1 on the base substrate 101; the sub-pixel at the $i^{th}$ row and the $j^{th}$ column and the sub-pixel at the $(i+1)^{th}$ row and the $(j+1)^{th}$ column are in different rows and the two sub-pixels are diagonally opposite to each other. The touch electrodes 104 of the two sub-pixels are electrically connected to each other through the first connection line 107, and an orthographic projection of the first connection line 107 on the base substrate 101 partially overlaps with the orthographic projection of the touch signal line TX1 on the base substrate 101.

In the array substrate 100, the touch electrodes 104 of two adjacent rows of sub-pixels in each touch sensing block 103 are connected through the first connection line 107, and at least part of the pixel electrodes 102 are connected to the drain 111B of the thin film transistor 111 through the second connection line 109. Since the second connection line 109 does not span the touch signal line TX, the connection method through the second connection line 109 can be called "short connection". Since the orthographic projection of the first connection line 107 on the base substrate 101 partially overlaps with the orthographic projection of the touch signal line TX on the base substrate 101, that is, the first connection line 107 needs to span the touch signal line TX, and the orthographic projection of the second connection line 109 on the base substrate 101 does not overlap with the orthographic projection of the touch signal line TX on the base substrate 101, that is, the second connection line 109 does not need to span the touch signal line TX, therefore, the first connection line 107 can be arranged at the position of the second connection line 109, so as to reasonably utilize the wiring space and avoid the undesired coupling caused by the line confusion.

It should be noted that, in this specification, the terms "source 111C of thin film transistor 111" and "drain 111B of thin film transistor 111" can be used interchangeably, that is, source 111C of thin film transistor 111 can also be referred to as drain 111B of thin film transistor 111, and drain 111B of thin film transistor 111 can also be referred to as source 111C of thin film transistor 111. It should be noted that a sub-pixel is usually an region surrounded by a gate line Gate and a data line Data, and the phrase "each sub-pixel comprises at least one thin film transistor 111" means that each sub-pixel is configured with at least one thin film transistor 111 (for example, the pixel electrode 102 of each sub-pixel is electrically connected to the drain 111B of the thin film transistor 111), but this does not limit the thin film transistor 111 to be located within the region of the sub-pixel. For example, due to different connection modes of the thin film transistors 111, the thin film transistors 111 of some sub-pixels may not be completely inside the region of the sub-pixel. In addition, in this document, terms such as "A and B are in the same layer" means that A and B are made of the same material and by the same process, but it is not required that A and B must have exactly the same thickness or height. The phrase "each row of sub-pixels is associated with two gate lines Gate of multiple gate lines Gate" means that the gates electrode 111A of the thin film transistors 111 of the same row of sub-pixels are connected to two different gate lines Gate.

In some embodiments, the gates 111A of the thin film transistors 111 electrically connected to the pixel electrode 102 of the first sub-pixel SP1 in the same row of pixels are electrically connected to the first gate line of the two gate lines Gate, the gates 111A of the thin film transistors 111 electrically connected to the pixel electrode 102 of the second sub-pixel SP2 in the same row of pixels are electrically connected to the second gate line of the two gate lines Gate, and the gates 111A of the thin film transistors 111 respectively electrically connected to the pixel electrode 102 of the third sub-pixel SP3 of two adjacent pixels in the same row of pixels are electrically connected to the first gate line and the second gate line, respectively. Exemplarily, FIG. 1 illustrates three rows of pixels, the first row of pixels is associated with the first gate line Gate1 and the second gate line Gate2, the first row of pixels comprises adjacent pixels P1 and P2, the gates 111A of the thin film transistors 111 electrically connected to the pixel electrode 102 of the first sub-pixel SP1 of the pixels P1 and P2 are electrically connected to the first gate line Gate1, the gates 111A of the thin film transistors 111 electrically connected to the pixel electrode 102 of the second sub-pixel SP2 of the pixels P1 and P2 are electrically connected to the second gate line Gate2, the gate 111A of the thin film transistor 111 electrically connected to the pixel electrode 102 of the third sub-pixel SP3 of the pixel P1 is electrically connected to the second gate line Gate2, and the gate 111A of the thin film transistor 111 electrically connected to the pixel electrode 102 of the third sub-pixel SP3 of the pixel P2 is electrically connected to the first gate line Gate1. The second row of pixels is associated with the first gate line Gate3 and the second gate line Gate4. The second row of pixels comprises adjacent pixels P3 and P4. The gates 111A of the thin film transistors 111 electrically connected to the pixel electrode 102 of the first sub-pixel SP1 of the pixels P3 and P4 are electrically connected to the first gate line Gate3, the gates 111A of the thin film transistors 111 electrically connected to the pixel electrode 102 of the second sub-pixel SP2 of the pixels P3 and P4 are electrically connected to the second gate line Gate4, the gate 111A of the thin film transistor 111 electrically connected to the pixel electrode 102 of the third sub-pixel SP3 of the pixel P3 is electrically connected to the second gate line Gate4, and the gate 111A of the thin film transistor 111 electrically connected to the pixel electrode 102 of the third sub-pixel SP3 of the pixel P4 is electrically connected to the first gate line Gate3. The third row of pixels is associated with the first gate line Gate5 and the second gate line Gate6, and the third row of pixels comprises adjacent pixels P5 and pixel P6, the gates 111A of the thin film transistors 111 electrically connected to the pixel electrode 102 of the first sub-pixel SP1 of pixels P5 and P6 are electrically connected to the first gate line Gate5, the gates 111A of the thin film transistors 111 electrically connected to the pixel electrode 102 of the second sub-pixel SP2 of pixels P5 and P6 are electrically connected to the second gate line Gate6, the gate 111A of the thin film transistor 111 electrically connected to the pixel electrode 102 of the third sub-pixel SP3 of pixel P5 is electrically connected to the second gate line Gate6, and the gate 111A of the thin film transistor 111 electrically connected to the pixel electrode 102 of the third sub-pixel SP3 of pixel P6 is electrically connected to the first gate line Gate5.

Every four adjacent pixels of the plurality of pixels in the array substrate 100 constitutes a repeating unit, and the four adjacent pixels are arranged in two rows and two columns and comprise a first pixel, a second pixel, a third pixel, and a fourth pixel. For example, the four adjacent pixels P1, P2, P3, and P4 in FIG. 1 constitute a repeating unit, and the four pixels P1, P2, P3, and P4 are arranged in two rows and two columns. The pixel P1 can be recorded as the first pixel P1, the pixel P2 can be recorded as the second pixel P2, the pixel P3 can be recorded as the third pixel P3, and the pixel P4 can be recorded as the fourth pixel P4. The first pixel P1 and the second pixel P2 are in the same row and the first pixel P1 and the third pixel P3 are in the same column, the third pixel P3 and the fourth pixel P4 are in the same row and the second pixel P2 and the fourth pixel P4 are in the same column. The sources 111C of the thin film transistors 111 electrically connected to the pixel electrode 102 of the first sub-pixel SP1 and the second sub-pixel SP2 of the first pixel P1 are electrically connected to the first data line Data1 among the multiple data lines Data, the sources 111C of the thin film transistors 111 electrically connected to the pixel electrode 102 of the third sub-pixel SP3 of the first pixel P1 and the first sub-pixel SP1 of the second pixel P2 are electrically connected to the second data line Data2 among the multiple data lines Data, the sources 111C of the thin film transistors 111 electrically connected to the pixel electrodes 102 of the second sub-pixel SP2 and the third sub-pixel SP3 of the second pixel P2 are electrically connected to the third data line Data3 among the plurality of data lines Data, the sources 111C of the thin film transistors 111 electrically connected to the pixel electrodes 102 of the first sub-pixel SP1 and the second sub-pixel SP2 of the third pixel P3 are electrically connected to the second data line Data2, the sources 111C of the thin film transistors 111 electrically connected to the pixel electrodes 102 of the third sub-pixel SP3 of the third pixel P3 and the first sub-pixel SP1 of the fourth pixel P4 are electrically connected to the third data line Data3, and the sources 111C of the thin film transistors 111 electrically connected to the pixel electrodes 102 of the second sub-pixel SP2 and the third sub-pixel SP3 of the fourth pixel P4 are electrically connected to the fourth data line Data4 among the plurality of data lines Data.

It should be noted that FIG. 1 illustrates an arrangement of the Z-architecture pixels of the array substrate 100 as an embodiment, but this does not limit the array substrate 100 to only this pixel arrangement. The array substrate 100 can also adopt other pixel arrangements of the Z-architecture. With the Z-architecture pixels, even if there are differences in the charging conditions of adjacent data lines Data, there will be no display differences between adjacent pixel columns, thereby avoiding the generation of undesirable phenomena such as vertical stripes or shaking head stripes.

The array substrate 100 may be an array substrate for a touch display device, and the touch principle of the touch display device may be roughly described in conjunction with FIG. 2. The touch display device may be an embedded touch display device using self-capacitive touch technology. As illustrated in FIG. 2, the array substrate 100 comprises a plurality of touch sensing blocks 103 (as self-capacitive electrodes) arranged in an array and touch signal lines TX electrically connected to the touch sensing blocks 103, respectively. The touch signal lines TX electrically connect the touch sensing blocks 103 to the touch control circuit 105. When performing touching, a touch object (for example, a human finger) touches the touch display device, and the capacitance of the touch sensing block 103 at the touch point changes. The touch control circuit 105 determines the touch position by detecting the change in the self-capacitance of the touch sensing block 103.

In some embodiments, each pixel electrode 102 of the array substrate 100 is electrically connected to the drain 111B of a corresponding thin film transistor 111 through the second connection line 109, that is, each pixel electrode 102 is electrically connected to the drain 111B of the thin film transistor 111 in a short connection manner. In some alternative embodiments, some pixel electrodes 102 of the array substrate 100 are electrically connected to the drain 111B of a corresponding thin film transistor 111 through the second connection line 109, and other pixel electrodes 102 of the array substrate 100 are electrically connected to the drain 111B of a corresponding thin film transistor 111 through another connection line.

Figure 6:
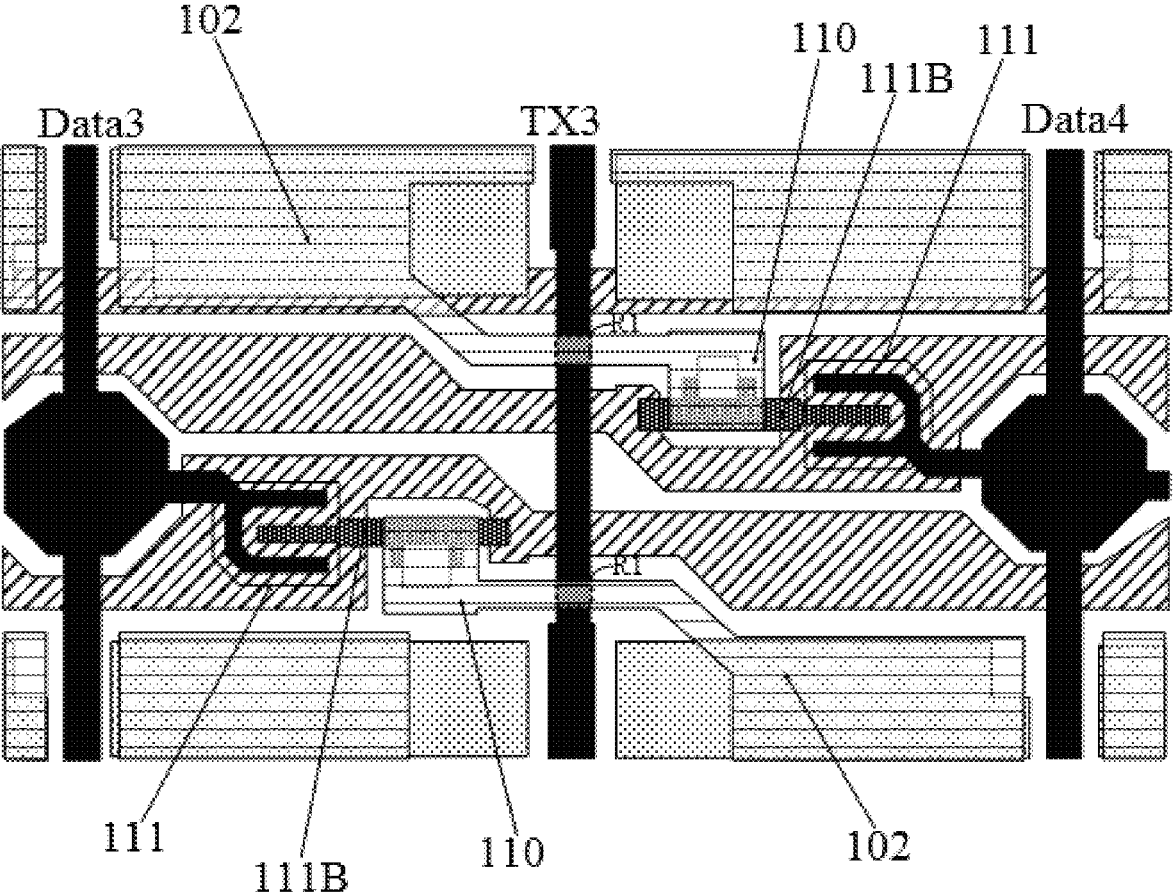
FIG. 6 illustrates a partial enlarged view of region III of FIG. 4.

FIG. 6 is a partial enlarged view of the region III circled by the dotted rectangular frame in FIG. 4. Referring to FIG. 4 and FIG. 6, the array substrate 100 may further comprise a third connection line 110, wherein part of the pixel electrodes 102 are electrically connected to the drain 111B of a corresponding thin film transistor 111 through the second connection line 109, and the remaining pixel electrodes 102 are electrically connected to the drain 111B of a corresponding thin film transistor 111 through the third connection line 110. An orthographic projection of the third connection line 110 on the base substrate 101 partially overlaps with the orthographic projection of the touch signal line TX (illustrated as the touch signal line TX3 in FIG. 6) on the base substrate 101. Since the third connection line 110 needs to span the touch signal line TX, the way in which the pixel electrode 102 is connected to the drain 111B of the thin film transistor 111 through the third connection line 110 can be called a "long connection". In other words, in this alternative embodiment, a part of the pixel electrode 102 is electrically connected to the drain 111B of the thin film transistor 111 by a short connection, and a part of the pixel electrode 102 is electrically connected to the drain 111B of the thin film transistor 111 by a long connection. The length of the third connection line 110 is greater than the length of the second connection line 109. The specific values of the lengths of the third connection line 110 and the second connection line 109 can be determined according to the specific design of the array substrate 100. In some embodiments, the first connection line 107, the second connection line 109, the third connection line 110, and the pixel electrode 102 can be in the same layer. During the preparation process, the four can be formed using the same material and the same mask. As illustrated in FIGS. 4 and 6, the orthographic projection of the third connection line 110 on the base substrate 101 does not overlap with the orthographic projection of the first connection line 107 on the base substrate 101. A first connection line 107 is arranged between two adjacent rows of sub-pixels in each repeating unit. Since the first connection line 107 spans the touch signal line TX, the third connection line 110 in the same layer as the first connection line 107 also spans the touch signal line TX. Therefore, the first connection line 107 is not arranged at the position where the third connection line 110 is arranged, so as to avoid the first connection line 107 and the third connection line 110 from overlapping each other, resulting in crowded and chaotic wiring space and thus the generation of undesirable parasitic capacitance. Since the second connection line 109 does not need to span the touch signal line TX, the first connection line 107 can be arranged at the position where the second connection line 109 is arranged, and the first connection line 107 is not arranged at the position where the third connection line 110 is arranged.

In some embodiments, as illustrated in FIG. 6, the portion where the orthographic projection of each third connection line 110 on the base substrate 101 overlaps with an orthographic projection of the touch signal line TX3 on the base substrate 101 constitutes a first overlapping region R1, and the areas of all first overlapping regions R1 are equal to each other. In this way, it can be ensured that the overlapping areas of all third connection lines 110 and the touch signal line TX are equal.

In some embodiments, a data line Data is arranged between every two columns of sub-pixels, and each of at least some data lines Data of the multiple data lines Data is arranged between two adjacent columns of sub-pixels, a touch signal line TX is arranged between every two columns of sub-pixels, and each touch signal line TX is arranged between two adjacent columns of sub-pixels and between two adjacent data lines Data. As illustrated in FIG. 1, in addition to data lines Data1 and Data4, data lines Data2 and Data3 are arranged between two adjacent columns of sub-pixels, touch signal line TX1 is arranged between two adjacent columns of sub-pixels and between data lines Data1 and Data2, touch signal line TX2 is arranged between two adjacent columns of sub-pixels and between data lines Data2 and Data3, and touch signal line TX3 is arranged between two adjacent columns of sub-pixels and between data lines Data3 and Data4. In this embodiment, the number of data lines Data in the array substrate 100 is equal to the number of touch signal lines TX, that is, the two are arranged in a quantity ratio of 1:1. In the array substrate 100, one data line Data is arranged every two columns of sub-pixels. Compared with the conventional technology in which a data line Data is arranged in each column of sub-pixels, the wiring method of the array substrate 100 reduces the number of data lines by half, and the remaining space can be used to arrange the touch signal line TX, so that the total number of signal lines will not be increased and the aperture ratio will not be reduced.

In some alternative embodiments, the ratio of the number of data lines Data of the array substrate 100 to the number of touch signal lines TX may not be 1:1. Alternatively, the ratio of the number of data lines Data to the number of touch signal lines TX may be 1:2, that is, one data line Data is arranged every two columns of sub-pixels, and two touch signal lines TX are arranged every two columns of sub-pixels. The two touch signal lines TX are adjacent to each other and arranged between two adjacent columns of sub-pixels. Since large-size touch display panels usually need to be arranged with more touch electrodes 104, this wiring method is particularly suitable for large-size touch display panels, such as large-size touch displays or TVs larger than 55 inches.

The array substrate 100 can be applied to In Cell touch display panels. On Cell touch display panels set the touch electrodes outside the display panel, while In Cell touch display panels set the touch electrodes inside the display panel. Compared with On Cell touch display panels, In Cell touch display panels have higher integration and are thinner and lighter, and have greater advantages in terms of cost and stability.

In some embodiments, the array substrate 100 may further comprise a liquid crystal layer (not illustrated in the figure), the touch electrode 104 and the pixel electrode 102 are on the same side of the liquid crystal layer, the pixel electrode 102 may be an electrode with a slit, and the materials of the touch electrode 104 and the pixel electrode 102 are both indium tin oxide (ITO). In other words, the array substrate 100 is a FIC (Full In Cell) touch process based on the Advanced Super Dimension Switch (ADS) technology. The ADS technology can overcome the problem of low light transmission efficiency of the conventional In-Plane-Switching (IPS) technology, and has advantages such as higher light transmission efficiency, hard screen, ultra-wide viewing angle, ultra-high color expression, ultra-high-speed motion picture processing, etc., so it is more suitable for application in larger-sized In Cell touch display products.

Figure 7:
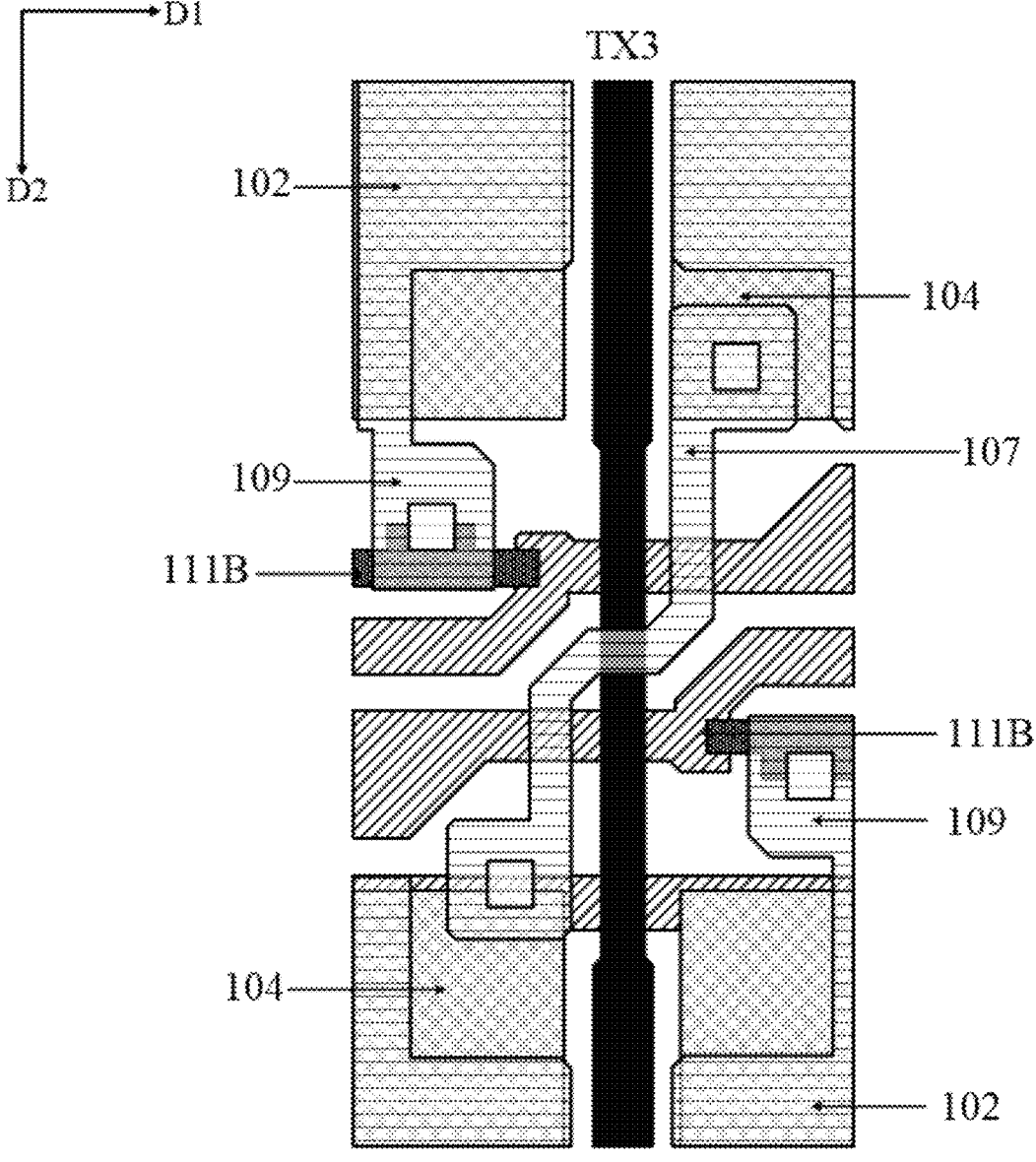
FIG. 7 illustrates a partial enlarged view of region IV of FIG. 4.

FIG. 7 is a partial enlarged view of the region IV circled by the dotted rectangular frame in FIG. 4. As illustrated in FIG. 7, in some embodiments, the orthographic projection of the first connection line 107 on the base substrate 101 partially overlaps with the orthographic projection of the touch signal line TX3 on the base substrate 101, and the extending direction of the first connection line 107 at the overlap is perpendicular to the extending direction of the touch signal line TX3 at the overlap. For example, the first connection line 107 extends along the first direction D1 at the overlap, and the touch signal line TX3 extends along the second direction D2 at the overlap, and the first direction D1 and the second direction D2 are perpendicular to each other. The first connection line 107 and the touch signal line TX3 adopt a vertical span-line wiring method, which can reduce the overlap capacitance between the first connection line 107 and the touch signal line TX3.

Referring to FIG. 3, the array substrate 100 may further comprise a plurality of common connection lines 106 extending along the first direction D1, each common connection line 106 being arranged between two adjacent rows of sub-pixels and located on one side of any one of two adjacent gate lines Gate. In some embodiments, the common connection line 106 and the gate line Gate are on the same layer. The touch electrodes 104 in the same row in each touch sensing block 103 are electrically connected to each other through the common connection line 106, and each common connection line 106 is disconnected at the interval region S between two adjacent touch sensing blocks 103.

Each common connection line 106 is electrically connected to a row of touch electrodes 104, but since the touch electrodes 104 of the array substrate 100 are time-division multiplexed, the individual touch sensing blocks 103 need to be independent of each other during the touch stage to achieve position detection. Therefore, each common connection line 106 is not continuous inside the array substrate 100 and needs to be disconnected at the interval region S between adjacent touch sensing blocks 103. The common connection line 106 electrically connects the individual touch electrodes 104 of a row of sub-pixels in each touch sensing block 103, and the touch electrodes 104 of two adjacent rows of sub-pixels in each touch sensing block 103 are electrically connected through the first connection line 107. In this way, the individual touch electrodes 104 in each touch sensing block 103 can form an electrode network, which is beneficial to improving the uniformity of the common voltage in the touch sensing block 103.

In the array substrate 100, the touch electrodes 104 are time-division multiplexed. During the display stage, the touch electrodes 104 are used as common electrodes; during the touch scanning stage, the touch electrodes 104 are used as touch sensing electrodes. Therefore, in the array substrate 100, the touch sensing blocks 103 need to be designed as multiple blocks that are separated and electrically insulated from each other to meet the touch position detection requirements. Each touch sensing block 103 is connected to the touch control circuit 105 through at least one touch signal line TX so that the touch control circuit 105 can locate the coordinates where the touch occurs. In some embodiments, the shape of each touch sensing block 103 can be approximately square, and the side length of each touch sensing block 103 can be between 5 mm and 15 mm according to different panel sizes and application scenarios. The better the touch performance, the smaller the area of a single touch sensing block 103 is required, and the smaller the area of the touch sensing block 103, the more touch sensing blocks 103 are required. Based on this principle, considering the performance and cost comprehensively, for medium and large-sized touch display products (such as TVs), one touch signal line TX can be designed in every two sub-pixels of display products of 55 inch 4K and below, and two touch signal lines TX can be designed in each sub-pixel of display products of 55 inch 4K and above.

Figure 8:
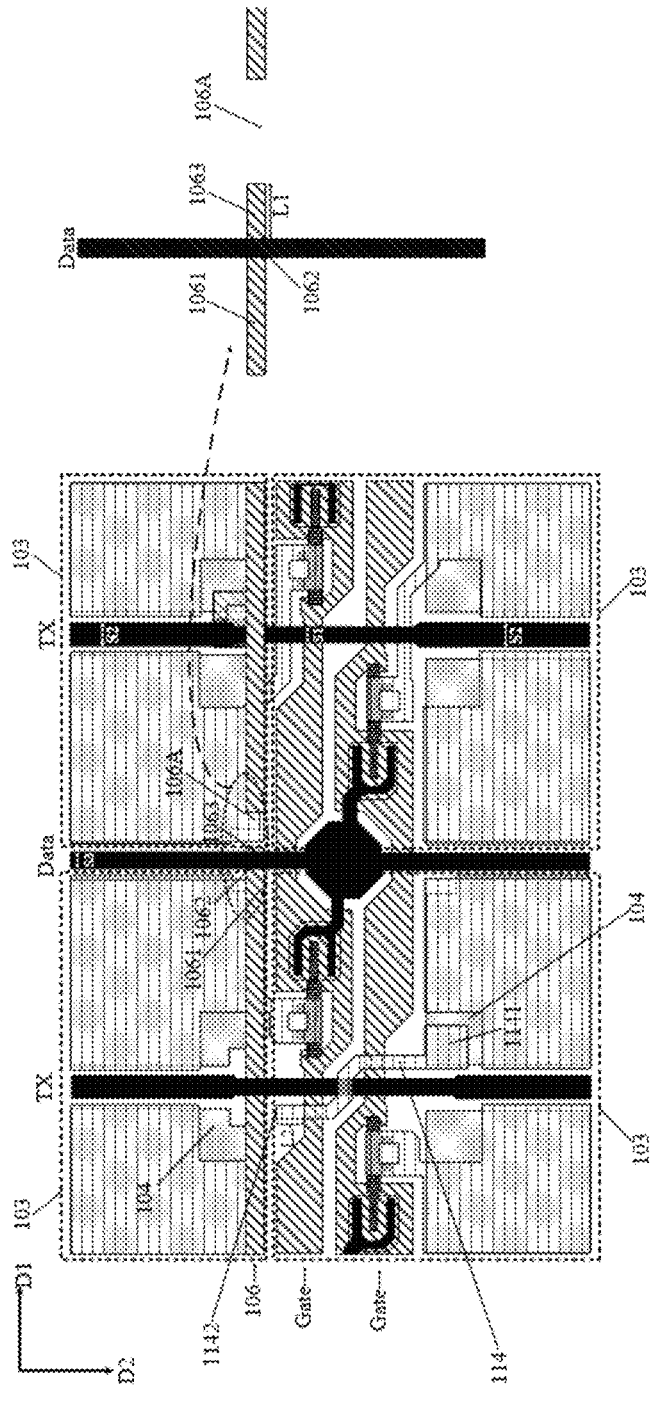
FIG. 8 illustrates the structural design of adjacent touch sensing blocks at the disconnected portion according to an embodiment of the present disclosure.

FIG. 8 illustrates the disconnection method of any four adjacent touch sensing blocks 103. The four touch sensing blocks 103 are arranged in two rows and two columns, and the four touch sensing blocks 103 are independent and insulated from each other.

The disconnection of two adjacent touch sensing blocks 103 in the first direction D1 is achieved by disconnecting the common connection line 106. Specifically, a data line Data is arranged at the interval region S between two adjacent touch sensing blocks 103 in the first direction D1, and the disconnected portion 106A of the common connection line 106 at the interval region S is at the first side of the data line Data, the first side is, for example, the right side of the data line Data in FIG. 8, the continuous portion of the common connection line 106 comprises a first sub-section 1061, a second sub-section 1062 and a third sub-section 1063 that are sequentially connected, the first sub-section 1061 is at the second side of the data line Data, the second side is, for example, the left side of the data line Data in FIG. 8, the third sub-section 1063 is at the first side of the data line Data, the second sub-section 1062 is between the first sub-section 1061 and the third sub-section 1063, and an orthographic projection of the second sub-section 1062 on the base substrate 101 falls within an orthographic projection of the data line Data on the base substrate 101. As illustrated in FIG. 8, the two boundaries of the second sub-section 1062 along the first direction D1 overlap with the two boundaries of the data line Data along the first direction D1, respectively. In some embodiments, the length L1 of the third sub-section 1063 along the first direction D1 is greater than or equal to a first threshold, and the first threshold is, for example, the alignment deviation between the metal layer where the common connection line 106 is located and the metal layer where the data line Data is located during the manufacturing stage. By making the third sub-section 1063 of the common connection line 106 exceed the first threshold of the data line Data, even if the common connection line 106 and the data line Data have an alignment deviation during the preparation process, it can be ensured that the common connection line 106 and the data line Data have an overlap. The spacing of the disconnected portion 106A of the common connection line 106 in the first direction D1 usually needs to be greater than or equal to d, where d is the minimum resolution of the exposure machine.

The disconnection of two adjacent touch sensing blocks 103 in the second direction D2 is achieved by disconnecting the fourth connection line 114. Specifically, as illustrated in FIG. 8, the array substrate 100 further comprises a fourth connection line 114, a first end 1141 of the fourth connection line 114 is electrically connected to a touch electrode 104 of one of the two touch sensing blocks 103 adjacent along the second direction D2, and a second end 1142 of the fourth connection line 114 is disconnected from a touch electrode 104 of the other of the two touch sensing blocks 103 adjacent along the second direction D2, so that the two touch sensing blocks 103 adjacent along the second direction D2 are electrically insulated from each other, which is beneficial to the accurate detection of the touch position.

As illustrated in FIG. 8, an orthographic projection of the fourth connection line 114 on the base substrate 101 spans orthographic projections of two gate lines Gate between two touch sensing blocks 103 adjacent to each other along the second direction D2 on the base substrate 101, and the distance L2 of the second end 1142 of the fourth connection line 114 extending beyond the gate line of the two gate lines Gate closest to the second end 1142 is greater than or equal to the second threshold, the second threshold is the alignment deviation of the metal layer where the fourth connection line 114 is located and the metal layer where the gate line Gate is located during the manufacturing stage, and the fourth connection line 114 can be in the same layer as the first connection line 107, the second connection line 109, the third connection line 110, and the pixel electrode 102. By making the distance L2 of the second end 1142 of the fourth connection line 114 beyond the adjacent gate lines greater than or equal to the second threshold, it can be ensured that even if the fourth connection line 114 and the gate line Gate have an alignment deviation, the fourth connection line 114 can still span the two adjacent gate lines Gate. Since the first connection line 107 also spans two adjacent gate lines Gate, the load of the gate line Gate at the location of the fourth connection line 114 is substantially the same as the load of the gate line Gate at the location of the first connection line 107. Therefore, the parasitic capacitance between the fourth connection line 114 and the gate line Gate is substantially equal to the parasitic capacitance between the first connection line 107 and the gate line Gate.

As illustrated in FIG. 8, in some embodiments, the touch signal line TX comprises a first portion with a narrower width and a second portion with a wider width, the width of the first portion along the first direction D1 is S1, and the width of the second portion along the first direction D1 is S2, where S1 is smaller than S2. The width of the data line Data along the first direction D1 is S3. In some embodiments, the width S2 of the touch signal line TX along the first direction D1 is greater than the width S3 of the data line Data along the first direction D1. In some alternative embodiments, the width S1 of the touch signal line TX along the first direction D1 is greater than the width S3 of the data line Data along the first direction D1.

Figure 9:
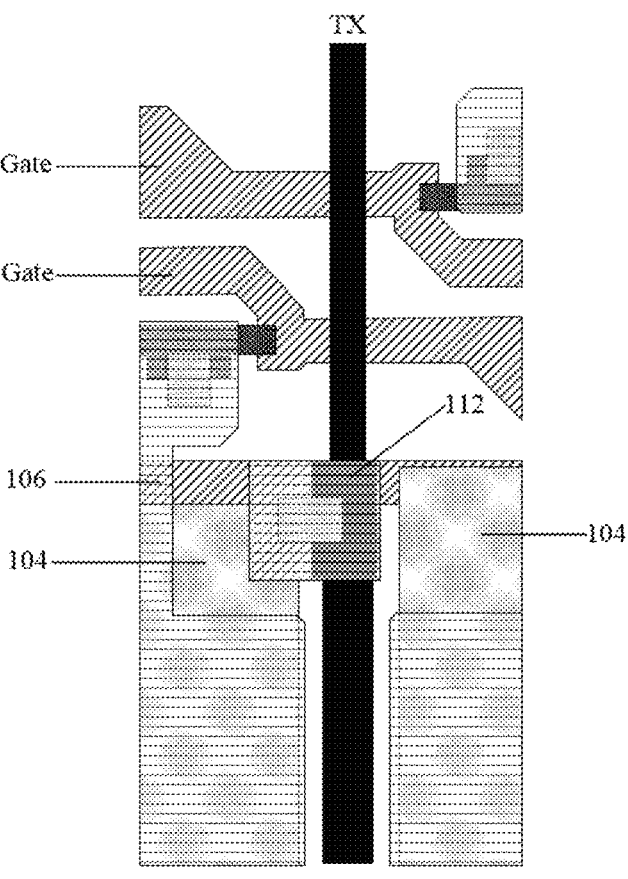
FIG. 9 illustrates a schematic diagram of the arrangement of the local structure of the array substrate according to an embodiment of the present disclosure.

FIG. 9 illustrates the arrangement of the vias 112. In the array substrate 100, each touch sensing block 103 is electrically connected to at least one of the multiple touch signal lines TX through the vias 112, and an orthographic projection of the vias 112 on the base substrate 101 does not overlap with the orthographic projection of the first connection line 107 on the base substrate 101. The touch signal line TX and the touch sensing block 103 are connected through the vias 112. Since the vias 112 occupy a certain position, in order to ensure the optimization of the pixel transmittance, the first connection line 107 is no longer designed at the position where the vias 112 are set.

Figure 10:
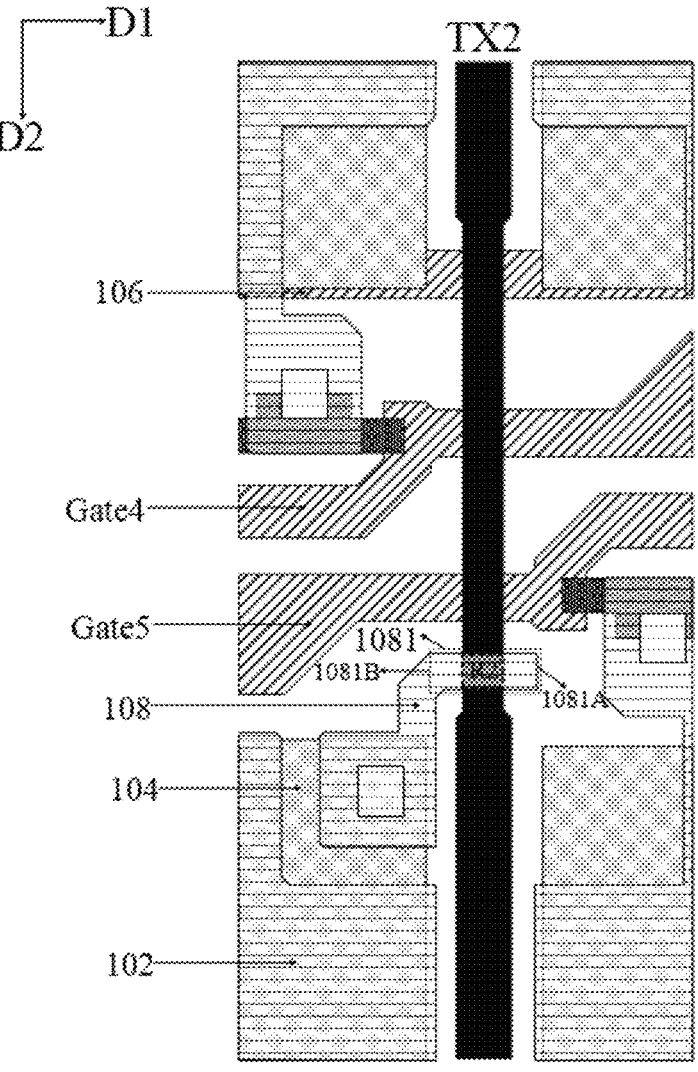
FIG. 10 illustrates a partial enlarged view of region V of FIG. 4.

FIG. 10 is a partial enlarged view of the region V circled by the dotted rectangular frame in FIG. 4. In addition to the first connection line 107, each repeating unit of the array substrate 100 may also be provided with a compensation line 108, an orthographic projection of the compensation line 108 on the base substrate 101 partially overlaps with the orthographic projection of the touch signal line TX on the base substrate 101, and the touch signal line TX overlapping with the compensation line 108 and the touch signal line TX overlapping with the first connection line 107 in each repeating unit are two different touch signal lines. Exemplarily, as described above, every four adjacent pixels in the array substrate 100 constitute a repeating unit, and the four adjacent pixels are arranged in two rows and two columns, and FIG. 4 illustrates a pixel structure of a repeating unit. As illustrated in FIG. 4, the repeating unit comprises a complete first connection line 107 and a portion of the first connection line 107, the complete first connection line 107 spans the touch signal line TX3 to generate a parasitic capacitance with the touch signal line TX3, and a portion of the first connection line 107 spans the touch signal line TX1 to generate a parasitic capacitance with the touch signal line TX1. If the compensation line 108 is not arranged, the touch signal line TX2 in the repeating unit has no signal line overlapping with it, so the parasitic capacitance of the touch signal line TX2 is different from the parasitic capacitance of the touch signal lines TX1 and TX3, thereby affecting the accuracy of the touch position detection of the array substrate. In order to ensure that the parasitic capacitance of each touch signal line TX is equal, in the embodiment provided by the present disclosure, a compensation line 108 is arranged at the touch signal line TX2 of each repeating unit, and the orthographic projection of the compensation line 108 on the base substrate 101 partially overlaps with an orthographic projection of the touch signal line TX2 on the base substrate 101, thereby generating parasitic capacitance. With this design, the parasitic capacitance of the touch signal line TX2 in the repeating unit is substantially equal to the parasitic capacitance of the touch signal lines TX1 and TX3, thereby helping to improve the accuracy of the touch position detection of the array substrate 100.

It should be noted that with respect to the so-called "complete first connection line 107 within the repeating unit", since the first connection line 107 is used to connect the touch electrodes 104 in two adjacent rows of sub-pixels, half of the first connection line 107 is in the upper sub-pixel, and the other half of the first connection line 107 is in the lower sub-pixel. The first connection line 107 overlapping with the touch signal line TX3 can be called a complete first connection line 107 within the repeating unit, while the first connection line 107 overlapping with the touch signal line TX1 cannot be called a complete first connection line 107 within the repeating unit, because only a portion of the first connection line 107 overlapping with the touch signal line TX1 is in the repeating unit.

As illustrated in FIG. 10, in some embodiments, a portion where the orthographic projection of each compensation line 108 on the base substrate 101 overlaps with the orthographic projection of the touch signal line TX2 on the base substrate 101 constitutes a second overlapping region R2, and the areas of all second overlapping regions R2 are equal to each other. This can further ensure that the parasitic capacitance between the compensation line 108 and the touch signal line TX2 in each repeating unit is equal to each other.

In some embodiments, the width of the compensation line 108 is equal to the width of the first connection line 107. The equal width can further ensure that the parasitic capacitance generated by the first connection line 107 and the touch signal line TX1 or TX3 is equal to the parasitic capacitance generated by the compensation line 108 and the touch signal line TX2. In some embodiments, the compensation line 108 and the pixel electrode 102 are in the same layer.

As illustrated in FIG. 10, the compensation line 108 comprises a sub-section 1081 extending along the first direction D1, an orthographic projection of the sub-section 1081 on the base substrate 101 partially overlaps with the orthographic projection of the touch signal line TX2 on the base substrate 101, and the two opposite ends 1081A and 1081B of the sub-section 1081 in the first direction D1 both extend beyond the touch signal line TX2. The sub-section 1081 of the compensation line 108 spans the touch signal line TX2 laterally, and the end 1081A of the laterally extending sub-section 1081 of the compensation line 108 extends beyond the touch signal line TX2 by a distance, for example, by 2 to 5 um, so that even if the compensation line 108 and the touch signal line TX2 have an alignment deviation, the compensation line 108 can still overlap with the touch signal line TX2, thereby generating parasitic capacitance.

Referring to FIG. 10, the orthographic projection of the compensation line 108 on the base substrate 101 does not overlap with an orthographic projection of the gate lines Gate4 and Gate5 and the common connection line 106 on the base substrate 101. In other words, the compensation line 108 is disconnected after overlapping with the touch signal line TX2, and no longer spans the gate lines Gate4 and Gate5 and the common connection line 106. In this way, the first connection line 107 in the repeating unit spans the gate lines Gate4 and Gate5 and the common connection line 106, and the other first connection line 107 spans the gate lines Gate2 and Gate3 and the other common connection line 106, so that the gate lines Gate2, Gate3, Gate4, and Gate5 can be guaranteed to have equal parasitic capacitance.

As mentioned above, the sub-pixels of pixels P1, P2, P3 and P4, a total of 12 sub-pixels, can constitute the minimum repetition period of the Z-architecture, that is, the repetition unit. Of course, the embodiments of the present disclosure do not limit the repetition unit to only this division method, and other reasonable division methods of the repetition unit should also fall within the scope of protection of the present disclosure.

Figure 11:
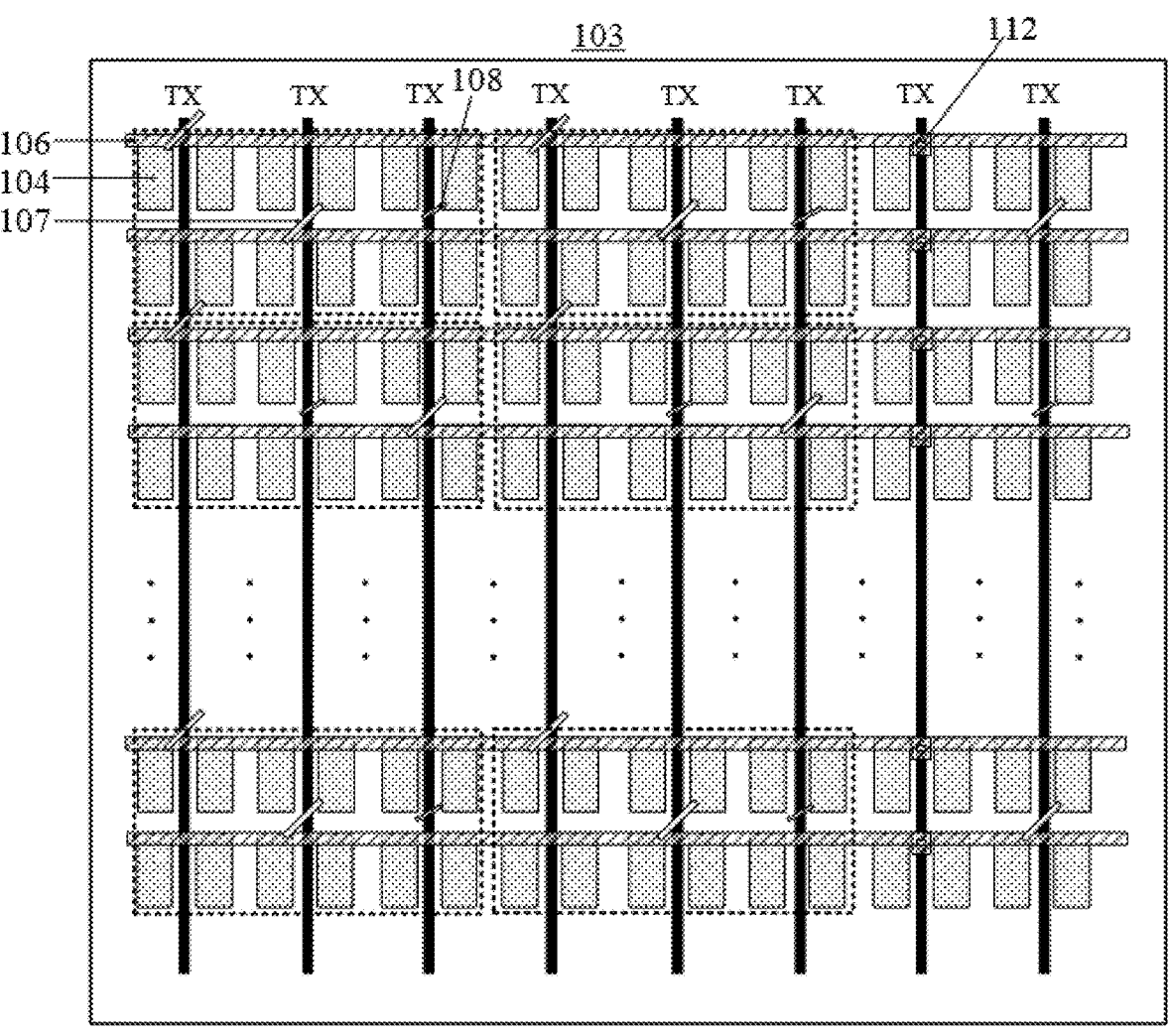
FIG. 11 illustrates a partial enlarged view of a touch sensing block of FIG. 2.

FIG. 11 is a partial enlarged schematic diagram of a touch sensing block 103 in FIG. 3. Each dotted rectangular frame in FIG. 11 represents a repeating unit. As illustrated in FIG. 11, each repeating unit comprises a complete first connection line 107 and a compensation line 108. Each touch sensing block 103 generally comprises hundreds to thousands of sub-pixels. Assuming that each touch sensing block 103 comprises M sub-pixels (M is generally an even number, and the order of magnitude of M can be, for example, 10 to $10^3$) in a horizontal direction and a touch signal line TX is arranged every two sub-pixels, there are M/2 touch signal lines TX passing through the touch sensing block 103. In some embodiments, only one touch signal line TX among the M/2 touch signal lines TX is a touch signal line driving the touch sensing block 103. The touch signal line TX driving the touch sensing block 103 is connected to the touch sensing block 103 through the via 112, and the other touch signal lines TX among the M/2 touch signal lines TX only pass through the touch sensing block 103 but are not connected to it. These other touch signal lines TX may pass through the touch sensing block 103 and be connected to other touch sensing blocks 103, or even if they are not connected to other touch sensing blocks 103, in order to ensure the consistency of pixel design, the touch signal lines TX in each touch sensing block 103 need to be evenly arranged.

Figure 12:
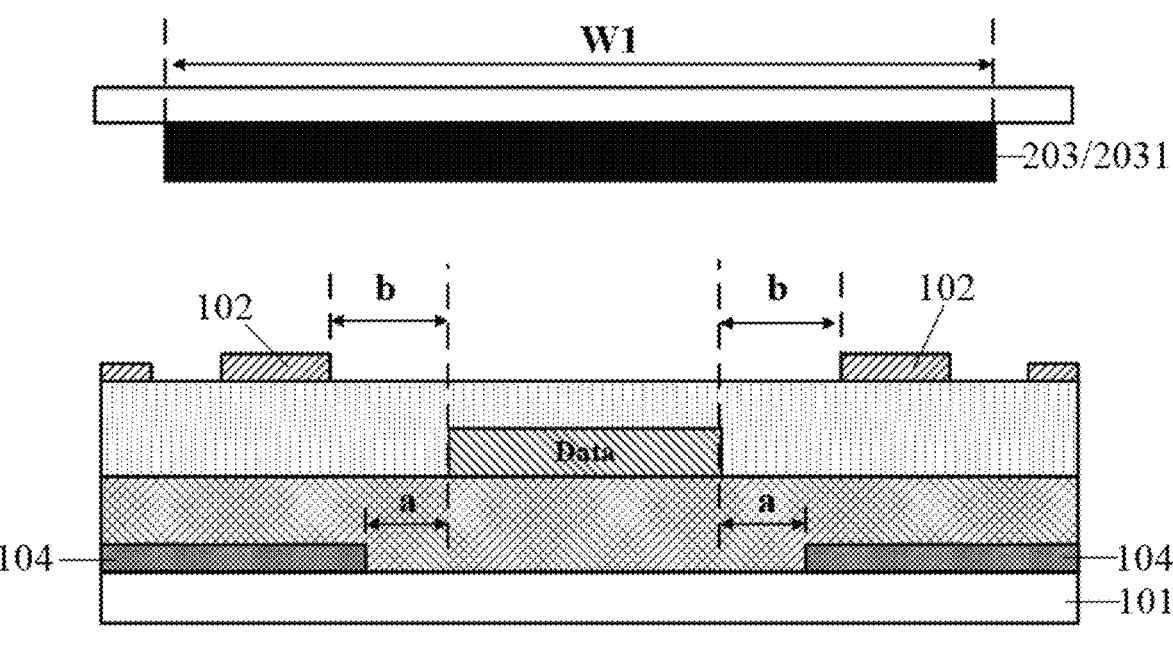
FIG. 12 illustrates a cross-sectional schematic diagram taken along line AA' of FIG. 4.
Figure 13:
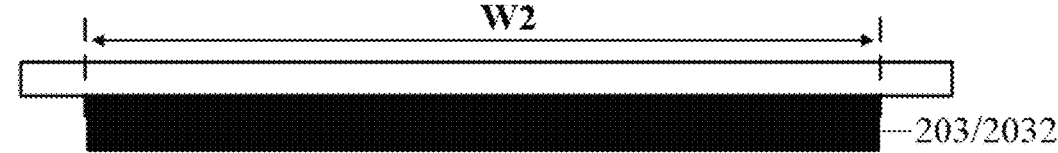
FIG. 13 illustrates a cross-sectional schematic diagram taken along line BB' of FIG. 4.
Figure 13:
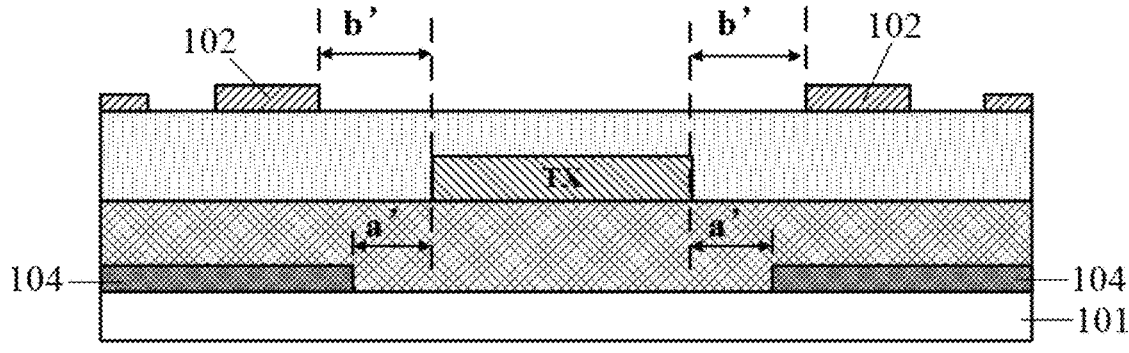

FIG. 12 is a cross-sectional view taken along line AA' of FIG. 4, and FIG. 13 is a cross-sectional view taken along line BB' of FIG. 4. As illustrated in FIGS. 12 and 13, the array substrate 100 may further comprise a light-shielding layer 203 on a side of the touch signal line TX and the data line Data away from the base substrate 101. The light-shielding layer 203 comprise a first light-shielding part 2031 and a second light-shielding part 2032, and the orthographic projection of the data line Data on the base substrate 101 falls within an orthographic projection of the first light-shielding part 2031 on the base substrate 101, and the orthographic projection of the touch signal line TX on the base substrate 101 falls within an orthographic projection of the second light-shielding part 2032 on the base substrate 101. The width of the first light-shielding part 2031 along the first direction D1 is the first width W1, the width of the second light-shielding part 2032 along the first direction D1 is the second width W2, and the width of each sub-pixel along the first direction D1 is the third width W3 (see FIG. 1). The first width W1, the second width W2, and the third width W3 satisfy the following conditions: the ratio of the absolute value of the difference between the first width W1 and the second width W2 to twice the third width W3 is less than or equal to 5%, that is, $|W1-W2|/(2*W3)\leq5\%$ which can ensure the uniformity of the display screen.

As illustrated in FIG. 12 and FIG. 13, the orthographic projection of the data line Data on the base substrate 101 does not overlap with an orthographic projection of the touch electrode 104 on the base substrate 101, and the orthographic projection of the touch signal line TX on the base substrate 101 does not overlap with the orthographic projection of the touch electrode 104 on the base substrate 101. As mentioned above, each touch sensing block 103 not only has the touch signal line TX connected to it passing through it, but also has multiple touch signal lines TX not connected to it passing through it. Since the smaller the parasitic capacitance between the touch signal line TX and other touch sensing blocks 103 that are not electrically connected to it, the more beneficial it is to the touch performance, therefore, in the embodiment of the present disclosure, the touch electrode 104 under the touch signal line TX is removed, so that the orthographic projection of the touch signal line TX on the base substrate 101 does not overlap with the orthographic projection of the touch electrode 104 on the base substrate 101, thereby reducing the parasitic capacitance between the touch signal line TX and the touch electrode 104 (and thus the touch sensing block 103).

As illustrated in FIG. 12, in the array substrate 100, the orthographic projection of the touch electrode 104 in each sub-pixel on the base substrate 101 at least partially overlaps with an orthographic projection of the pixel electrode 102 in the sub-pixel on the base substrate 101. For each data line Data and two columns of sub-pixels located on both sides of the data line Data, the distance between the orthographic projection of the touch electrode 104 in each column of the two columns of sub-pixels on the base substrate 101 and the orthographic projection of the data line Data on the base substrate 101 is a first distance a, and the distance between the orthographic projection of the pixel electrode 102 in each column of the two columns of sub-pixels on the base substrate 101 and the orthographic projection of the data line Data on the base substrate 101 is a second distance b, the second distance b is greater than the first distance a, and the difference between the second distance b and the first distance a is greater than or equal to a third threshold c, that is, $b-a \geq c$, and the third threshold c is the alignment deviation of the mask used to prepare the touch electrode 104 and the mask used to prepare the pixel electrode 102 during the exposure process. In some embodiments, the values of a, b, and c are less than or equal to 10 μm. By making $b-a \geq c$, even if the touch electrode 104 and the pixel electrode 102 have an alignment deviation, the overlapping area of the touch electrode 104 and the pixel electrode 102 will not change, thereby ensuring that the storage capacitance of the pixel remains unchanged and improving the yield of the array substrate 100.

As illustrated in FIG. 13, in the array substrate 100, for each touch signal line TX and two columns of sub-pixels on both sides of the touch signal line TX, the distance between the orthographic projection of the touch electrode 104 in each column of the two columns of sub-pixels on the base substrate 101 and the orthographic projection of the touch signal line TX on the base substrate 101 is a third distance a', and the distance between the orthographic projection of the pixel electrode 102 in each column of the two columns of sub-pixels on the base substrate 101 and the orthographic projection of the touch signal line TX on the base substrate 101 is a fourth distance b', the fourth distance b' is greater than the third distance a', and the difference between the fourth distance b' and the third distance a' is greater than or equal to the third threshold c, that is, $b'-a'=b-a \geq c$. a' is not necessarily equal to a, and b' is not necessarily equal to b. Generally speaking, the larger the values of a' and b' (i.e., the farther the touch signal line TX being from the touch electrode 104 and the pixel electrode 102), the smaller the parasitic capacitance between the touch signal line TX and the touch electrode 104 and the pixel electrode 102, and the more favorable the touch performance; however, the longer the distance, the smaller the effective light transmission region of the pixel, so the values of a' and b' can be set according to the specific specifications of the array substrate 100.

In some embodiments, the touch electrode 104 is on the base substrate 101; the gate line Gate and the common connection line 106 are on the same layer and both are on the side of the touch electrode 104 away from the base substrate 101; the data line Data and the touch signal line TX are on the same layer and both are on the side of the gate line Gate away from the base substrate 101; the pixel electrode 102, the first connection line 107, the second connection line 109, the third connection line 110, the fourth connection line 114, and the compensation line 108 are on the same layer and they are on the side of the data line Data away from the base substrate 101. During the preparation process, the touch electrode 104 can be formed by patterning the first metal layer using a first mask, and the material of the first metal layer can be, for example, ITO; the gate line Gate and the common connection line 106 can be formed by patterning the second metal layer using a second mask; the data line Data and the touch signal line TX can be formed by patterning the third metal layer using a third mask; the pixel electrode 102, the first connection line 107, the second connection line 109, the third connection line 110, the fourth connection line 114, and the compensation line 108 can be formed by patterning the fourth metal layer using a fourth mask, and the material of the fourth metal layer can be, for example, ITO. In this way, the number of masks can be greatly saved, and the process flow and cost can be saved. Other required film layers, such as a gate insulation layer, an active layer, etc., can also be arranged between the gate line Gate and the data line Data. Other required film layers, such as a passivation layer, etc., can also be arranged between the data line Data and the pixel electrode 102.

Figure 14:
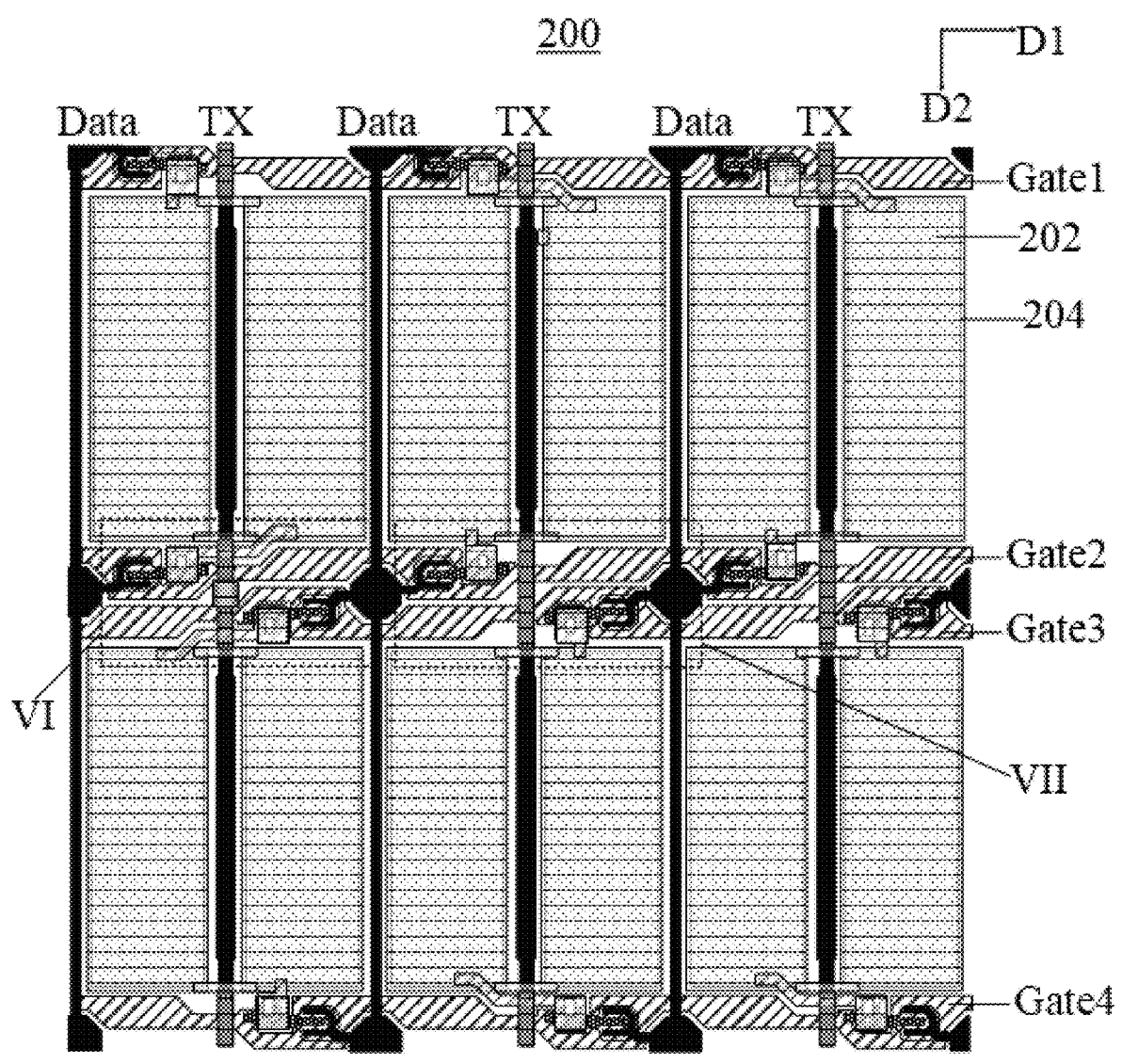
FIG. 14 illustrates a planar schematic diagram of the local structure of the array substrate according to another embodiment of the present disclosure.

FIG. 14 is a schematic plan view of a partial structure of an array substrate 200. Except for the relative position relationship of some film layers, the array substrate 200 illustrated in FIG. 14 has a structure substantially the same as that of the array substrate 100 illustrated in FIG. 4. For example, the pixel structure of the array substrate 200 is also arranged as a Z-architecture pixel; the array substrate 200 comprises the first connection line 107 as described above, and the first connection line 107 is used to connect the touch electrodes of two adjacent rows of sub-pixels in each touch sensing block 103; the first connection line 107 is arranged at the position of the second connection line 109 of the array substrate 200, but the first connection line 107 is not arranged at the position of the third connection line 110; each repeating unit comprises a compensation line 108 so that all touch signal lines TX have substantially the same parasitic capacitance; the electrical insulation of two adjacent touch sensing blocks 103 in the first direction D1 is achieved by disconnecting the common connection line, and the electrical insulation of two adjacent touch sensing blocks 103 in the second direction D2 is achieved by disconnecting the fourth connection line 114, etc. The detailed structures and functions of these components can refer to the description of FIG. 4, and will not be repeated here. For the sake of brevity, the similarities between the array substrate 200 of FIG. 14 and the array substrate 100 of FIG. 4 will not be described again, and only the differences will be described below.

Different from the array substrate 100, in the array substrate 200, the pixel electrode 202 is on the base substrate 101, and the touch electrode 204 is on the side of the pixel electrode 202 away from the base substrate 101. Specifically, the pixel electrode 202 is on the base substrate 101; the gate line Gate is on the side of the pixel electrode 202 away from the base substrate 101; the data line Data and the touch signal line TX are on the same layer and both are on the side of the gate line Gate away from the base substrate 101; the touch electrode 204 is on the side of the data line Data away from the base substrate 101, wherein the first connection line 107, the second connection line 109, the third connection line 110, the fourth connection line 114, the compensation line 108 and the common connection line 205 (see FIG. 15) can be on the same layer as the touch electrode 204. The material of the pixel electrode 202 and the touch electrode 204 can be ITO.

Figure 15:
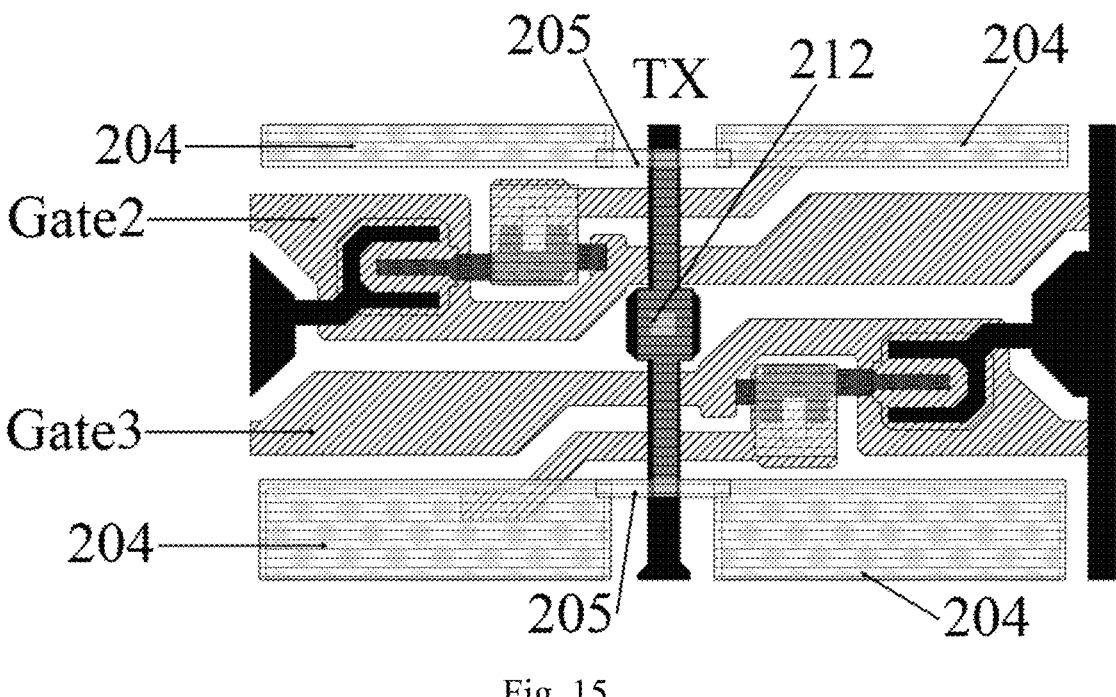
FIG. 15 illustrates a partial enlarged view of region VI of FIG. 14.

FIG. 15 is a partial enlarged view of the region VI circled by the dotted rectangular frame in FIG. 14. In the array substrate 200, each touch sensing block 103 is electrically connected to at least one of the multiple touch signal lines TX through the via 212, and an orthographic projection of the via 212 on the base substrate 101 is between orthographic projections of the two gate lines Gate between two adjacent rows of sub-pixels on the base substrate 101. For example, in FIG. 15, the orthographic projection of the via 212 on the base substrate 101 is between orthographic projections of the two gate lines Gate2 and Gate3 between two adjacent rows of sub-pixels on the base substrate 101, so that the wiring space can be reasonably utilized.

Figure 16:
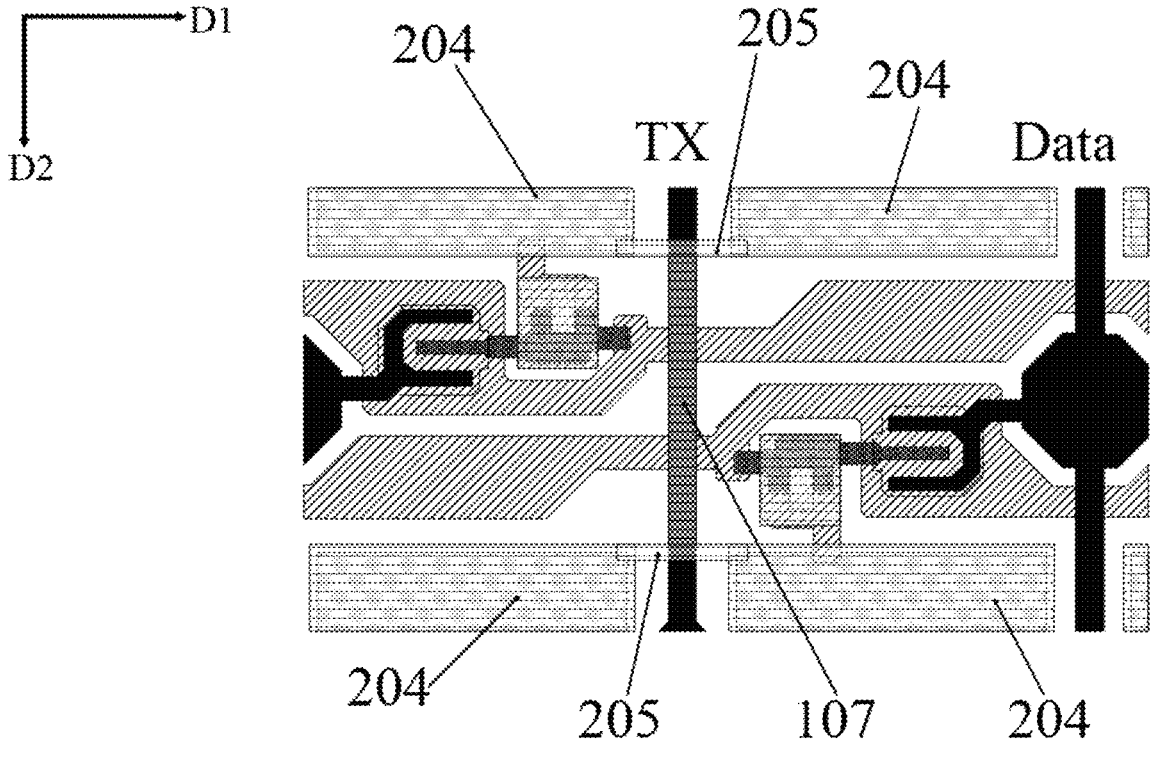
FIG. 16 illustrates a partial enlarged view of region VII of FIG. 14.

FIG. 16 is a partial enlarged view of the region VII circled by the dotted rectangular frame in FIG. 14. As illustrated in FIG. 16, two touch electrodes 204 adjacent in the first direction D1 can be electrically connected through a common connection line 205. The touch electrodes 204 of two adjacent rows of sub-pixels in each touch sensing block 103 are electrically connected through a first connection line 107, and the extending direction of the first connection line 107 is substantially the same as the extending direction of the touch signal line TX, and the orthographic projection of the first connection line 107 on the base substrate 101 falls within the orthographic projection of the touch signal line TX on the base substrate 101. Since the first connection line 107 and the touch electrode 204 are in the same layer, the first connection line 107 can be directly connected to the touch electrode 204 without being connected through a via.

In some alternative embodiments, the extending direction of the first connection line 107 may be different from the extending direction of the touch signal line TX, for example, the extending direction of the first connection line 107 has a certain inclination angle relative to the extending direction of the touch signal line TX, and the orthographic projection of the first connection line 107 on the base substrate 101 overlaps at most a part with the orthographic projection of the touch signal line TX on the base substrate 101. By this arrangement, the overlapping area of the first connection line 107 and the touch signal line TX can be reduced, thereby reducing the coupling between the two.

Other technical effects of the array substrate 200 can refer to the description of the technical effects of the array substrate 100. For the purpose of brevity, they will not be described repeatedly here.

Figure 17:
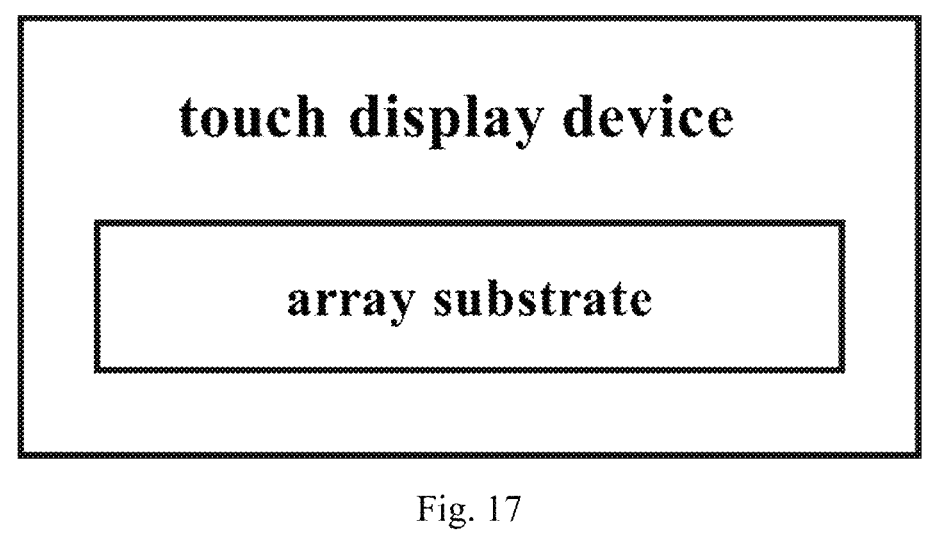

FIG. 17 illustrates a block diagram of a touch display device provided according to an embodiment of the present disclosure. The touch display device may comprise the array substrate 100 or 200 described in any of the previous embodiments. In some embodiments, the touch display device may be an embedded touch display device, which comprises an array substrate, an opposing substrate, and a liquid crystal layer between the array substrate and the opposing substrate. The array substrate is the array substrate 100 or 200 described in any of the previous embodiments. The touch display device comprises but is not limited to: liquid crystal panel, electronic paper, OLED (organic light-emitting diode) panel, mobile phone, tablet computer, television, display, notebook computer, digital photo frame, navigator, and any other product or component with touch and display functions.

The touch display device may have substantially the same technical effects as the array substrate 100 or 200 described in the previous embodiments. For the purpose of brevity, the technical effects of the touch display device will not be described repeatedly here.

It will be understood that although the terms first, second, third, etc. may be used herein to describe various elements, components, regions, layers and/or portions, these elements, components, regions, layers and/or portions should not be limited by these terms. These terms are only used to distinguish an element, component, region, layer or portion from another element, component, region, layer or portion. Thus, a first element, component, region, layer or portion discussed above could be termed a second element, component, region, layer or portion without departing from the teachings of the present disclosure.

Spatially relative terms such as "row", "column", "below", "above", "left", "right", etc. may be used herein for ease of description to describe factors such as the relationship of an element or feature to another element(s) or feature(s) illustrated in the figures. It will be understood that these spatially relative terms are intended to encompass different orientations of the device in use or operation in addition to the orientation depicted in the figures. For example, if the device in the figures is turned over, elements described as "below" other elements or features would then be oriented "above" other elements or features. Thus, the exemplary term "below" can encompass both an orientation of above and an orientation of below. The device may be otherwise oriented (rotated 90 degrees or at other orientations) and the spatially relative descriptors used herein are interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to limit the present disclosure. As used herein, the singular forms "a," "an," and "the" are intended to comprise the plural forms as well, unless the context clearly dictates otherwise. It will be further understood that the terms "comprise" and/or "include" when used in this specification designate the presence of stated features, integers, steps, operations, elements and/or parts, but do not exclude the presence or addition of one or more other features, integers, steps, operations, elements, components and/or groups thereof. As used herein, the term "and/or" comprises any and all combinations of one or more of the associated listed items. In the description of this specification, description with reference to the terms "an embodiment," "another embodiment," etc. means that a particular feature, structure, material, or characteristic described in connection with the embodiment is included in at least one embodiment of the present disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine the different embodiments or examples as well as the features of the different embodiments or examples described in this specification without conflicting each other.

It will be understood that when an element or layer is referred to as being "on", "connected to", "coupled to", or "adjacent to" another element or layer, it may be directly on, directly connected to, directly coupled to, or directly adjacent to another element or layer, or intervening elements or layers may be present. In contrast, when an element is referred to as being "directly on", "directly connected to", "directly coupled to", "directly adjacent to" another element or layer, no intervening elements or layers are present. However, in no case should "on" or "directly on" be interpreted as requiring a layer to completely cover the layer below.

Embodiments of the disclosure are described herein with reference to schematic illustrations (and intermediate structures) of idealized embodiments of the disclosure. As such, variations to the shapes of the illustrations are to be expected, e.g., as a result of manufacturing techniques and/or tolerances. Accordingly, embodiments of the present disclosure should not be construed as limited to the particular shapes of the regions illustrated herein, but are to comprise deviations in shapes due, for example, to manufacturing. Thus, the regions illustrated in the figures are schematic in nature and their shapes are not intended to illustrate the actual shape of a region of a device and are not intended to limit the scope of the present disclosure.

Unless otherwise defined, all terms (comprising technical and scientific terms) used herein have the same meaning as commonly understood by one of ordinary skill in the art to which this disclosure belongs. It will be further understood that terms such as those defined in commonly used dictionaries should be construed to have meanings consistent with their meanings in the relevant art and/or the context of this specification, and will not be idealized or overly interpreted in a formal sense, unless expressly defined as such herein.

The above descriptions are merely specific embodiments of the present disclosure, but the protection scope of the present disclosure is not limited thereto. Any changes or substitutions that those skilled in the art can easily think of within the technical scope disclosed by the present disclosure should be encompassed within the protection scope of the present disclosure. Therefore, the protection scope of the present disclosure should be based on the protection scope of the claims.

The invention claimed is:

1. An array substrate comprising:

a base substrate comprising a plurality of pixels arranged in an array, the plurality of pixels comprising a plurality of sub-pixels arranged in an array, each of the plurality of sub-pixels comprising a pixel electrode, a touch electrode, and a thin film transistor;

a plurality of touch sensing blocks on the base substrate and electrically insulated from each other, each of the plurality of touch sensing blocks comprising a plurality of touch electrodes, the plurality of touch electrodes of each touch sensing block electrically connected to each other and arranged in an array;

a plurality of gate lines extending along a first direction, each row of sub-pixels being associated with two gate lines among the plurality of gate lines;

a plurality of touch signal lines and a plurality of data lines extending along a second direction, the touch signal lines and the data lines being in a same layer, each touch sensing block being electrically connected to at least one of the plurality of touch signal lines, the first direction intersecting with the second direction;

a first connection line, two adjacent rows of touch electrodes in each touch sensing block being electrically connected through the first connection line; and a second connection line, each of at least a part of a plurality of pixel electrodes being electrically connected to a drain of a corresponding thin film transistor through the second connection line, an orthographic projection of the second connection line on the base substrate not overlapping with an orthographic projection of a respective one of the touch signal lines on the base substrate, wherein a gate of the thin film transistor of each sub-pixel is electrically connected to a respective one of the gate lines, the drain of the thin film transistor of each sub-pixel is electrically connected to the pixel electrode of the sub-pixel, a source of the thin film transistor of each sub-pixel is electrically connected to a respective one of the data lines, every two adjacent sub-pixels in a same row of sub-pixels form a unit group, the sources of the thin film transistors of each unit group are electrically connected to a same data line, the gates of the thin film transistors of each unit group are electrically connected to different gate lines, respectively, and the sources of the thin film transistors of two adjacent sub-pixels in the same column of sub-pixels are electrically connected to different data lines, respectively, and wherein every four adjacent pixels among the plurality of pixels form a repeating unit, each repeating unit comprises four adjacent sub-pixels that are arranged in two rows and two columns, the pixel electrodes of two sub-pixels among the four adjacent sub-pixels that are in different rows and diagonally opposite are respectively electrically connected to the drain of the corresponding thin film transistor through the second connection line, and the touch electrodes of the other two sub-pixels among the four adjacent sub-pixels that are in different rows and diagonally opposite are electrically connected through the first connection line.

2. The array substrate according to claim 1, further comprising a plurality of common connection lines extending along the first direction, wherein each of the plurality of common connection lines is arranged between two adjacent rows of sub-pixels, the individual touch electrodes in a same row of each touch sensing block are electrically connected to each other through the common connection line, and each common connection line is disconnected at an interval region between two adjacent touch sensing blocks.

3. The array substrate according to claim 2, wherein an orthographic projection of the first connection line on the base substrate partially overlaps with the orthographic projection of the touch signal line on the base substrate, and the first connection line is arranged between two adjacent rows of sub-pixels in each repeating unit.

4. The array substrate according to claim 3, wherein each repeating unit is further provided with a compensation line, an orthographic projection of the compensation line on the base substrate partially overlaps with the orthographic projection of the touch signal line on the base substrate, and the touch signal line overlapping with the compensation line and the touch signal line overlapping with the first connection line in each repeating unit are two different touch signal lines.

5. The array substrate according to claim 4, wherein the compensation line comprises a sub-section extending along the first direction, an orthographic projection of the sub-section on the base substrate partially overlaps with the orthographic projection of the touch signal line on the base substrate, and two opposite ends of the sub-section in the first direction both extend beyond the touch signal line.

6. The array substrate according to claim 4, wherein the orthographic projection of the compensation line on the base substrate does not overlap with orthographic projections of the gate line and the common connection line on the base substrate.

7. The array substrate according to claim 4, wherein a width of the compensation line is equal to a width of the first connection line.

8. The array substrate according to claim 4, wherein a portion where the orthographic projection of the compensation line on the base substrate overlaps with the orthographic projection of the touch signal line on the base substrate forms a second overlapping region, and areas of all the second overlapping regions are equal to each other.

9. The array substrate according to claim 2, wherein the data line is arranged at the interval region between any two adjacent touch sensing blocks along the first direction, a disconnected portion of the common connection line at the interval region is on a first side of the data line, a continuous portion of the common connection line comprises a first sub-section, a second sub-section, and a third sub-section that are sequentially connected, the first sub-section is on a second side of the data line, the third sub-section is on the first side of the data line, the second sub-section is between the first sub-section and the third sub-section, and an orthographic projection of the second sub-section on the base substrate falls within an orthographic projection of the data line on the base substrate.

10. The array substrate according to claim 9, wherein a length of the third sub-section along the first direction is greater than or equal to a first threshold.

11. The array substrate according to claim 2, further comprising a fourth connection line, wherein a first end of the fourth connection line is electrically connected to the touch electrode of one of any two adjacent touch sensing blocks along the second direction, a second end of the fourth connection line is disconnected from the touch electrode of the other of the any two adjacent touch sensing blocks along the second direction, so that the any two adjacent touch sensing blocks along the second direction are electrically insulated from each other.

12. The array substrate according to claim 11, wherein an orthographic projection of the fourth connection line on the base substrate spans an orthographic projection of two gate lines between the any two adjacent touch sensing blocks along the second direction on the base substrate, and a distance that the second end of the fourth connection line extends beyond one of the two gate lines that is closest to the second end is greater than or equal to a second threshold.

13. The array substrate according to claim 1, wherein an orthographic projection of the data line on the base substrate does not overlap with an orthographic projection of the touch electrode on the base substrate, and the orthographic projection of the touch signal line on the base substrate does not overlap with the orthographic projection of the touch electrode on the base substrate.

14. The array substrate according to claim 13, wherein,
one data line is arranged every two columns of sub-pixels, and each of at least a part of the plurality of data lines is arranged between two adjacent columns of sub-pixels; and
one touch signal line is arranged every two columns of sub-pixels, and each touch signal line is arranged between two adjacent columns of sub-pixels and between two adjacent data lines.

15. The array substrate according to claim 14, wherein the orthographic projection of the touch electrode in each sub-pixel on the base substrate at least partially overlaps with an orthographic projection of the pixel electrode in the sub-pixel on the base substrate,
for each data line and two columns of sub-pixels on both sides of the data line, a distance between the orthographic projection of the touch electrodes in each column of sub-pixels among the two columns of sub-pixels on the base substrate and the orthographic projection of the data line on the base substrate is a first distance, a distance between the orthographic projection of the pixel electrodes in each column of sub-pixels among the two columns of sub-pixels on the base substrate and the orthographic projection of the data line on the base substrate is a second distance, the second distance is greater than the first distance and a difference between the second distance and the first distance is greater than or equal to a third threshold.

16. The array substrate according to claim 15, wherein for each touch signal line and two columns of sub-pixels on both sides of the touch signal line, a distance between the orthographic projection of the touch electrodes in each column of sub-pixels among the two columns of sub-pixels on the base substrate and the orthographic projection of the touch signal line on the base substrate is a third distance, a distance between the orthographic projection of the pixel electrodes in each column of sub-pixels among the two columns of sub-pixels on the base substrate and the orthographic projection of the touch signal line on the base substrate is a fourth distance, the fourth distance is greater than the third distance and a difference between the fourth distance and the third distance is greater than or equal to the third threshold.

17. The array substrate according to claim 1, wherein the pixel electrode is on the base substrate, the gate line is on a side of the pixel electrode away from the base substrate, the data line and the touch signal line are on a side of the gate line away from the base substrate, the touch electrode and the first connection line are in a same layer and both are on a side of the data line away from the base substrate.

18. The array substrate according to claim 17, wherein an extending direction of the first connection line is different from an extending direction of the touch signal line, and an orthographic projection of the first connection line on the base substrate overlaps at most a part with the orthographic projection of the touch signal line on the base substrate.

19. The array substrate according to claim 17, wherein each touch sensing block is electrically connected to at least one of the plurality of touch signal lines through a via, and an orthographic projection of the via on the base substrate is between orthographic projections of two gate lines between two adjacent rows of sub-pixels on the base substrate.

20. The array substrate according to claim 17, wherein an extending direction of the first connection line is the same as an extending direction of the touch signal line, and an orthographic projection of the first connection line on the base substrate falls within the orthographic projection of the touch signal line on the base substrate.

21. The array substrate according to claim 1, further comprising a third connection line, wherein each of the part of the plurality of pixel electrodes is electrically connected to the drain of the corresponding thin film transistor through the second connection line, each of the remaining of the plurality of pixel electrodes is electrically connected to the drain of the corresponding thin film transistor through the third connection line, and an orthographic projection of the third connection line on the base substrate partially overlaps with the orthographic projection of the touch signal line on the base substrate.

22. The array substrate according to claim 21, wherein the orthographic projection of the third connection line on the base substrate does not overlap with an orthographic projection of the first connection line on the base substrate.

23. The array substrate according to claim 21, wherein a portion where the orthographic projection of the third connection line on the base substrate overlaps with the orthographic projection of the touch signal line on the base substrate forms a first overlapping region, and areas of all first overlapping regions are equal to each other.

24. The array substrate according to claim 1, wherein a width of the touch signal line is greater than a width of the data line.

25. The array substrate according to claim 24, wherein the touch signal line comprises a first part and a second part, and a width of the first part is smaller than a width of the second part.

26. The array substrate according to claim 1, wherein each pixel comprises a first sub-pixel, a second sub-pixel, and a third sub-pixel sequentially arranged along the first direction, the adjacent four pixels of each repeating unit are arranged in two rows and two columns and comprise a first pixel, a second pixel, a third pixel, and a fourth pixel, the first pixel and the second pixel are in a same row and the first pixel and the third pixel are in a same column, the third pixel and the fourth pixel are in a same row and the second pixel and the fourth pixel are in a same column, the sources of the thin film transistors of the first sub-pixel and the second sub-pixel of the first pixel are electrically connected to a first data line among the plurality of data lines, the sources of the thin film transistors of the third sub-pixel of the first pixel and the first sub-pixel of the second pixel are electrically connected to a second data line among the plurality of data lines, the sources of the thin film transistors of the second sub-pixel and the third sub-pixel of the second pixel are electrically connected to a third data line among the plurality of data lines, the sources of the thin film transistors of the first sub-pixel and the second sub-pixel of the third pixel are electrically connected to the second data line, the sources of the thin film transistors of the third sub-pixel of the third pixel and the first sub-pixel of the fourth pixel are electrically connected to the third data line, and the sources of the thin film transistors of the second sub-pixel and the third sub-pixel of the fourth pixel are electrically connected to a fourth data line among the plurality of data lines.

27. The array substrate according to claim 26, wherein the gates of the thin film transistors of all first sub-pixels in the same row of pixels are electrically connected to a first gate line of the two gate lines, the gates of the thin film transistors of all second sub-pixels in the same row of pixels are electrically connected to a second gate line of the two gate lines, and the gates of the thin film transistors of the third sub-pixels of two adjacent pixels in the same row of pixels are electrically connected to the first gate line and the second gate line, respectively.

28. The array substrate according to claim 1, wherein an orthographic projection of the first connection line on the base substrate partially overlaps with the orthographic projection of the touch signal line on the base substrate, and an extending direction of the first connection line at an overlapping region is perpendicular to an extending direction of the touch signal line at the overlapping region.

29. The array substrate according to claim 1, wherein each touch sensing block is electrically connected to at least one of the plurality of touch signal lines through a via, and an orthographic projection of the via on the base substrate does not overlap with an orthographic projection of the first connection line on the base substrate.

30. The array substrate according to claim 1, further comprising a light-shielding layer on a side of the touch signal line and the data line away from the base substrate, wherein the light-shielding layer comprises a first light-shielding part and a second light-shielding part, an orthographic projection of the data line on the base substrate falls within an orthographic projection of the first light-shielding part on the base substrate, the orthographic projection of the touch signal line on the base substrate falls within an orthographic projection of the second light-shielding part on the base substrate, a width of the first light-shielding part along the first direction is a first width, a width of the second light-shielding part along the first direction is a second width, a width of each sub-pixel along the first direction is a third width, the first width, the second width, and the third width satisfy the following condition:

a ratio of an absolute value of a difference between the first width and the second width to twice the third width is less than or equal to 5%.

31. The array substrate according to claim 1, wherein a ratio of a number of the data lines to a number of the touch signal lines is 1:2, one data line is arranged every two columns of sub-pixels, two touch signal lines are arranged every two columns of sub-pixels, and the two touch signal lines are arranged between two adjacent columns of sub-pixels.

32. The array substrate according to claim 1, wherein the touch electrode is on the base substrate, the gate line is on a side of the touch electrode away from the base substrate, the data line and the touch signal line are on a side of the gate line away from the base substrate, and the pixel electrode and the first connection line are in a same layer and both are on a side of the data line away from the base substrate.

33. The array substrate according to claim 1, further comprising a liquid crystal layer, wherein the touch electrode and the pixel electrode are on a same side of the liquid crystal layer, and materials of the touch electrode and the pixel electrode comprise indium tin oxide.

34. A touch display device comprising the array substrate according to claim 1.

* * * * *